(12) United States Patent
Fukuda

(10) Patent No.: US 10,200,567 B2
(45) Date of Patent: Feb. 5, 2019

(54) IMAGE PROCESSOR AND IMAGE PROCESSING SYSTEM

(71) Applicant: Oki Data Corporation, Tokyo (JP)

(72) Inventor: Takafumi Fukuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/818,583

(22) Filed: Nov. 20, 2017

(65) Prior Publication Data

US 2018/0152599 A1 May 31, 2018

(30) Foreign Application Priority Data

Nov. 29, 2016 (JP) .................................. 2016-231130

(51) Int. Cl.
*H04N 1/44* (2006.01)
*H04N 1/00* (2006.01)
*H04N 1/32* (2006.01)

(52) U.S. Cl.
CPC ....... *H04N 1/4433* (2013.01); *H04N 1/00307* (2013.01); *H04N 1/32122* (2013.01); *H04N 2201/006* (2013.01); *H04N 2201/0094* (2013.01); *H04N 2201/3205* (2013.01)

(58) Field of Classification Search
CPC ............. H04N 1/4433; H04N 1/00307; H04N 1/32122; H04N 2201/006; H04N 2201/0094; H04N 2201/3205
See application file for complete search history.

(56) References Cited

U.S. PATENT DOCUMENTS

2012/0268770 A1* 10/2012 Fukuda ................. G06F 21/608
358/1.14
2016/0154615 A1* 6/2016 Yamamoto ............ G06F 3/1222
358/1.14

FOREIGN PATENT DOCUMENTS

JP 2008-044264 A 2/2008

* cited by examiner

*Primary Examiner* — Quang N Vo
(74) *Attorney, Agent, or Firm* — Rabin & Berdo, P.C.

(57) ABSTRACT

An image processor includes: an information acquiring circuitry causing a first communicator to perform communication with a mobile terminal and acquires status information and identification information; an authentication circuitry performing a first authentication process on a basis of the identification information; a second communicator performing communication of image data with the mobile terminal; a display displaying an authentication waiting screen receiving an input of authentication information and a first post-authentication screen corresponding to first authentication information; and a controller selecting, on a basis of the status information, one of first and second operations on a condition that the first authentication process is successful when the display displays the authentication waiting screen. The first operation causes the display to display the first post-authentication screen. The second operation causes the second communicator to perform the communication of the image data without causing the display to display the first post-authentication screen.

19 Claims, 18 Drawing Sheets

| USER NAME UN | PASSWORD PW | TERMINAL IDENTIFICATION INFORMATION ID | USER TYPE UT | USE AUTHORITY INFORMATION IA |
| --- | --- | --- | --- | --- |
| admin | pass_admin | 0123456789ABCDEF | A | IR1 |
| user1 | pass_1 | 0FEDCBA987654321 | U | IR2 |
| user2 | pass_2 | ABCDEF0123456789ABCDEF0123456789 | U | IR3 |
| | | | | |

ADMINISTRATOR AUTHENTICATION — 210

- USER NAME: admin — 211
- PASSWORD: ******** — 212
- [LOGIN] — 213

FIG. 7B

REGISTERED USER LIST — 220

| USER NAME | USER TYPE | TERMINAL IDENTIFICATION INFORMATION |
|---|---|---|
| ☐ admin | ADMINISTRATOR | 0123456789ABCDEF |
| ☐ user1 | USER | 0FEDCBA987654321 |
| ☐ user2 | USER | ABCDEF0123456789ABCDEF0123456789 |
|  |  |  |
|  |  |  |
|  |  |  |
|  |  |  |
|  |  |  |

[ADD] 221  [CHANGE] 222  [DELETE] 223

230

REGISTER/CHANGE USER

| USER NAME | ☐ | 231 |
| PASSWORD | ☐ | 232 |
| TERMINAL IDENTIFICATION INFORMATION | ☐ | 233 |
| USER TYPE | ○ ADMINI-STRATOR  ⦿ USER | 234 |

[EXECUTE] 235   [CANCEL] 236

SELECT PRINTING TARGET

| FILE | 411 |
| WEB | 412 |
| CAMERA | 413 |

DISPLAY OF TERMINAL IDENTIFICATION INFORMATION — 414

FIG. 8A

IMAGE PROCESSOR AND IMAGE PROCESSING SYSTEM

CROSS REFERENCE TO RELATED APPLICATIONS

The present application claims priority from Japanese Patent Application No. 2016-231130 filed on Nov. 29, 2016, the entire contents of which are hereby incorporated by reference.

BACKGROUND

The technology relates to an image processor that processes an image, and an image processing system provided with the image processor.

For example, some image forming apparatuses prompts a user to input authentication information, and perform an authentication process on the basis of the inputted authentication information. When the authentication process is successful, the image forming apparatuses perform a process in accordance with an instruction given by the user. Such a technique is disclosed in Japanese Unexamined Patent Application Publication No. 2008-044264, for example.

SUMMARY

It is desired that an electronic apparatus have high usability for a user. It is also expected to further improve usability of an image processor that processes an image.

It is desirable to provide an image processor and an image processing system that improve usability for a user.

According to one embodiment of the technology, there is provided an image processor including an information acquiring circuitry, an authentication circuitry, a second communicator, a display, and a controller. The information acquiring circuitry causes a first communicator to perform communication between a mobile terminal and the first communicator and thereby acquires status information and identification information. The status information indicates a status of the mobile terminal. The identification information is information on identification of the mobile terminal. The authentication circuitry performs a first authentication process on the basis of the identification information. The second communicator performs communication of image data between the mobile terminal and the second communicator. The display displays an authentication waiting screen and a first post-authentication screen. The authentication waiting screen receives an input of authentication information. The first post-authentication screen corresponds to first authentication information. The controller selects, on the basis of the status information, one of a first operation and a second operation on a condition that the first authentication process is successful when the display displays the authentication waiting screen. The first operation causes the display to display the first post-authentication screen. The second operation causes the second communicator to perform the communication of the image data without causing the display to display the first post-authentication screen.

According to one embodiment of the technology, there is provided an image processor including a communicator, an information acquiring circuitry, an authentication circuitry, and a controller. The communicator performs communication between a mobile terminal and the communicator. The information acquiring circuitry acquires status information and identification information by the communication between the mobile terminal and the communicator. The status information indicates a status of the mobile terminal. The identification information is information on identification of the mobile terminal. The authentication circuitry performs an authentication process on the basis of the identification information acquired by the information acquiring circuitry. The controller determines, on the basis of the status information, to perform one of a transition operation and an image data reception operation on a condition that the authentication process by the authentication circuitry is successful on the basis of the identification information. The transition operation makes a transition to a login status in which a user corresponding to the identification information performs login. The image data reception operation receives image data from the mobile terminal without making the transition to the login status.

According to one embodiment of the technology, there is provided an image processing system including a mobile terminal and an image processor. The image processor includes an information acquiring circuitry, an authentication circuitry, a second communicator, a display, and a controller. The information acquiring circuitry causes a first communicator to perform communication between the mobile terminal and the first communicator and thereby acquires status information and identification information. The status information indicates a status of the mobile terminal. The identification information is information on identification of the mobile terminal. The authentication circuitry performs a first authentication process on the basis of the identification information. The second communicator performs communication of image data between the mobile terminal and the second communicator. The display displays an authentication waiting screen and a first post-authentication screen. The authentication waiting screen receives an input of authentication information. The first post-authentication screen corresponds to first authentication information. The controller selects, on the basis of the status information, one of a first operation and a second operation on a condition that the first authentication process is successful when the display displays the authentication waiting screen. The first operation causes the display to display the first post-authentication screen. The second operation causes the second communicator to perform the communication of the image data without causing the display to display the first post-authentication screen.

BRIEF DESCRIPTION OF DRAWINGS

FIG. 3 describes an example of a configuration of user management information illustrated in FIG. 1.

FIG. 7A describes an example of an administrator authentication screen.

FIG. 7B describes an example of a user management screen.

FIG. 7C describes an example of a user information editing screen.

FIG. 8A describes an example of a home screen.

DETAILED DESCRIPTION

Figure 1:
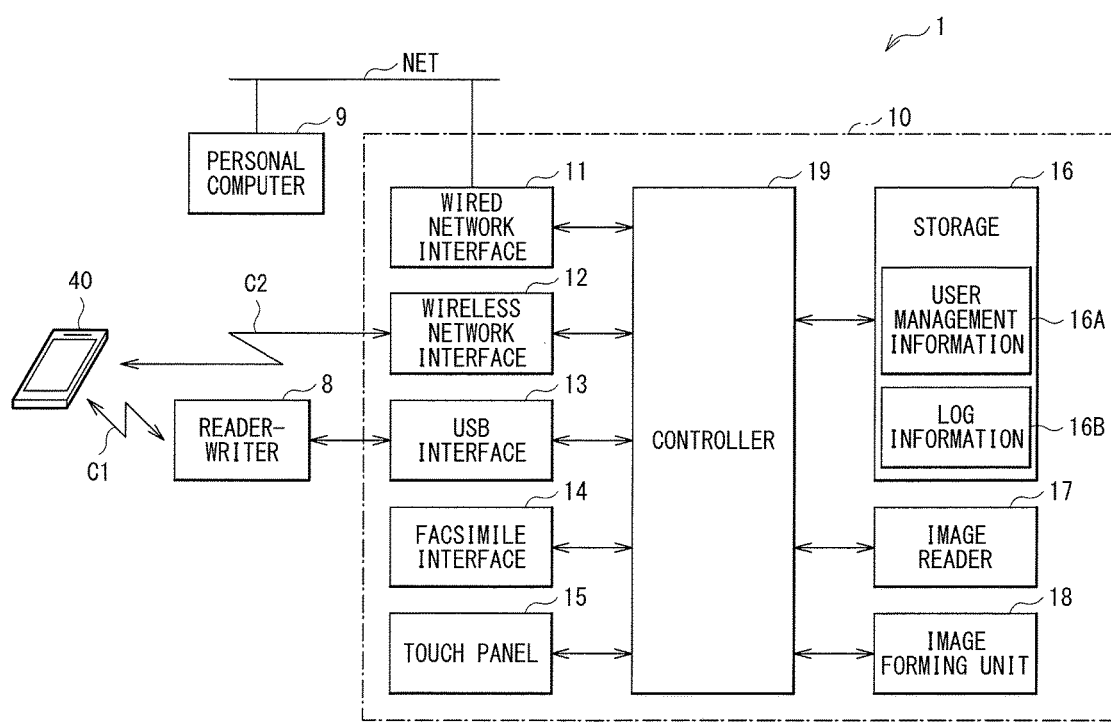
FIG. 1 is a block diagram illustrating an example of a configuration of an image processing system according to one example embodiment of the technology.

Some example embodiments of the technology are described in detail below with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail.

[Example Embodiment]
[Configuration Example]
[Overall Configuration Example]

FIG. 1 illustrates an example of a configuration of an image processing system, i.e., an image processing system 1, according to one example embodiment of the technology. The image processing system 1 may include an image processor 10, a reader-writer 8, a personal computer 9, and a smartphone 40.

The image processor 10 may be a so-called multi-function peripheral (MFP) having functions such as a printing function, a copy function, a scanning function, and a facsimile function. The image processor 10 may be connected to a wired network NET, and perform communication between the personal computer 9 and the image processor 10 via the wired network NET. The wired network NET may include, for example but not limited to, a wired local area network (LAN). Further, the image processor 10 may be coupled to a reader-writer 8, for example but not limited to, by means of a universal serial bus (USB). The image processor 10 may cause the reader-writer 8 to perform near field communication (NFC) C1 between the smartphone 40 and the reader-writer 8, thereby performing communication between the smartphone 40 and the image processor 10. Further, the image processor 10 may perform wireless network communication C2 between the smartphone 40 and the image processor 10, for example but not limited to, by means of wireless LAN.

The image processor 10 may allow a user to use the image processor 10 after execution of a login process. As used herein, the term "login process" refers to a series of processes that are to be performed from reception of an input of authentication information to achievement of a state in which the user is allowed to use the image processor 10. For example, the login process may include an authentication process and a process that reflects various settings related to the user. The authentication process may perform authentication on the basis of the inputted authentication information. The process that reflects the various settings related to the user may include, for example but not limited to, setting of authority for use.

Figure 2A:
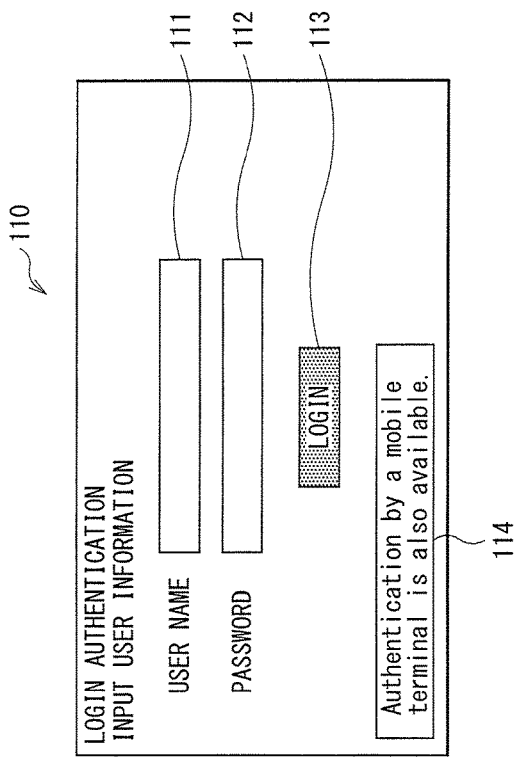
FIG. 2A describes an example of an authentication waiting screen.
Figure 2B:
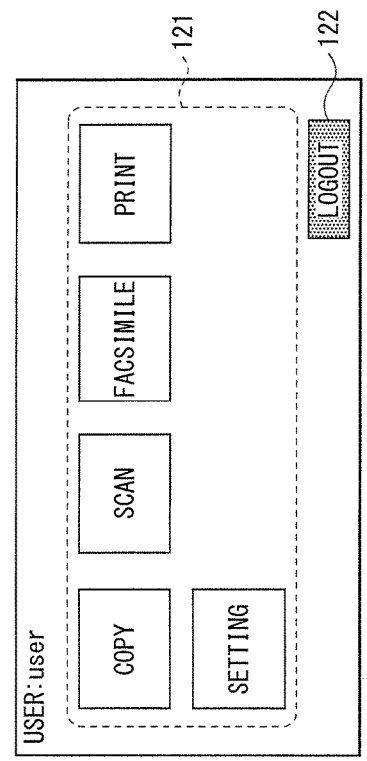
FIG. 2B describes an example of a menu screen.

For example, the image processor 10 may display an authentication waiting screen 110 illustrated in FIG. 2A, and wait for an input of the authentication information by the user. As illustrated in FIG. 2A by way of example, the authentication waiting screen 110 may be provided with a user name input box 111, a password input box 112, and a "login" button 113. The user may input a user name UN into the user name input box 111 and a password PW into the password input box 112, and operate the "login" button 113. In response to the foregoing input of the user name UN and the password PW by the user and the operation of the "login" button 113 by the user, the image processor 10 may perform the authentication process on the basis of the user name UN and the password PW both inputted by the user. When the authentication process is successful, the image processor 10 may perform various settings related to the user, and switch a display screen from the authentication waiting screen 110 to a menu screen 120 illustrated in FIG. 2B. The display screen may refer to a screen that is displayed on a related device. As illustrated in FIG. 2B by way of example, the menu screen 120 may be provided with a plurality of function icons 121 and a "logout" button 122. The user name UN may be displayed in an upper-left region of the menu screen 120. Further, the user may operate any of the function icons 121 and select a function which the user intends to use. In response to the operation of any of the function icons 121 by the user, the image processor 10 may perform a process on the basis of an instruction given by the user. For example, when the authority for use is set, an icon related to a function which the user is permitted to use in the plurality of function icons 121 may be displayed in color, and an icon related to a function which the user is not permitted to use may be displayed in grayscale. Further, the user may operate the "logout" button 122. The image processer 10 may perform a logout process in response to the operation of the "logout" button 122 by the user. The image processor 10 may thereby cause the authentication waiting screen 110 illustrated in FIG. 2A to be displayed again as the display screen, and wait for an input of the authentication information by another user.

Moreover, the execution of the login process by the image processor 10 may be achievable by the use of the smartphone 40, without directly inputting the authentication information into the image processor 10. Specifically, as illustrated in FIG. 2A, the image processor 10 may display a message 114 that "Authentication by a mobile terminal is also available" on the authentication waiting screen 110. The user may hold the smartphone 40 over the reader-writer 8. In response to the holding-over of the smartphone 40 by the user, the image processor 10 may receive terminal identification information ID of the smartphone 40 from the smartphone 40 by means of the near field communication C1, and become able to perform the authentication process on the basis of the received terminal identification information ID. The terminal identification information ID will be described later in greater detail.

The reader-writer 8 may perform the communication between the smartphone 40 and the reader-writer 8 by means of the near field communication C1. The reader-writer 8 may be coupled to the image processor 10 by means of the USB. It is to be noted that, although the reader-writer 8 may be coupled to the image processor 10 by means of the USB in this example, a way of coupling the reader-writer 8 to the image processor 10 is not limited thereto. In one example embodiment, the reader-writer 8 may be coupled to the image processor 10 via the wired network NET. In another example embodiment, the reader-writer 8 may be built in the image processor 10.

The personal computer 9 may be coupled to the wired network NET. The personal computer 9 may perform communication between the image processor 10 and the personal computer 9 via the wired network NET. In this example, the personal computer 9 may generate print data DP on the basis of contents such as a document and an image created by the user, and supply the generated print data DP to the image processor 10 via the wired network NET. Further, the personal computer 9 may be able to perform various settings of the image processor 10 on the basis of an operation by the user, for example but not limited to, by means of a web browser.

It is to be noted that, although the personal computer 9 may perform the communication between the image processor 10 and the personal computer 9 via the wired network NET in this example, a way of the communication between the image processor 10 and the personal computer 9 is not limited thereto. In one example embodiment, the personal computer 9 may perform the communication between the image processor 10 and the personal computer 9 by means of wireless LAN.

The smartphone 40 may be a so-called high-functional mobile phone provided with a mobile phone function, a camera function, an electronic mail transmission and reception function, a web page browsing function, and any other function. The smartphone 40 may supply the image processor 10 with the terminal identification information ID and a wireless information request flag F both of which will be described later in greater detail, by performing the near field communication C1 between the reader-writer 8 and the smartphone 40. This may allow the image processor 10 to perform the authentication process on the basis of the terminal identification information ID. The smartphone 40 may also have a function of performing communication between the image processor 10 and the smartphone 40 by means of the wireless network communication C2. Specifically, as will be described later, when the smartphone 40 supplies the image processor 10 with the wireless information request flag F indicating "ON", the smartphone 40 may receive network setting information IN, which will be described later, from the image processor 10. The smartphone 40 may perform network setting on the basis of the received network setting information IN, and perform the communication between the image processor 10 and the smartphone 40 by means of the wireless network communication C2. The smartphone 40 may be thus able to supply the print data DP to the image processor 10 by means of the wireless network communication C2.

It is to be noted that, although the smartphone may be used in this example, the mobile terminal to be used is not limited thereto. In one example embodiment, a tablet terminal or any of various types of mobile terminals may be used.

The configuration described above may allow the image processor 10 to form an image on a recording medium on the basis of the print data DP, for example, when the image processor 10 receives the print data DP from the personal computer 9 via the wired network NET. Further, when the user holds the smartphone 40 over the reader-writer 8 and the image processor 10 receives the later-described terminal identification information ID and the later-described wireless information request flag F from the smartphone 40 by means of the near field communication C1, the image processor 10 may perform the authentication process on the basis of the received terminal identification information ID. Further, when the authentication process is successful, the image processor 10 may perform, on the basis of the wireless information request flag F, one of the following two operations, as will be described later in greater detail. One of the two operations may switch the display screen of the image processor 10 from the authentication waiting screen 110 illustrated in FIG. 2A to the menu screen 120 illustrated in FIG. 2B, and form the image on the recording medium on the basis of the print data DP supplied from the smartphone 40 by means of the wireless network communication C2. The other of the two operations may keep the authentication waiting screen 110 to be displayed as the display screen, and form the image on the recording medium on the basis of the print data DP supplied from the smartphone 40 by means of the wireless network communication C2.

[Image Processor 10]

The image processor 10 may include a wired network interface 11, a wireless network interface 12, a USB interface 13, a facsimile interface 14, a touch panel 15, a storage 16, an image reader 17, an image forming unit 18, and a controller 19.

The wired network interface 11 may perform communication between the personal computer 9 and the wired network interface 11 via the wired network NET. The wireless network interface 12 may perform communication between the smartphone 40 and the wireless network interface 12 by means of the wireless network communication C2. The USB interface 13 may perform communication between the reader-writer 8 and the USB interface 13 by means of the USB. The facsimile interface 14 may perform transmission and reception of data with a communication partner via a telephone line.

The touch panel 15 may include, for example but not limited to, a liquid crystal display and a touch sensor. The touch panel 15 may display contents such as an operation state of the image processor 10, and receive an operation by the user.

The storage 16 may include, for example but not limited to, a read-only memory (ROM) or a non-volatile memory. The storage 16 may store, for example but not limited to, a control program, setting information of the image processor 10, the print data DP, and intermediate image data generated on the basis of the print data DP. The control program may be directed to various controls such as an apparatus control, a communication control, and a printing control. The storage 16 may also store user management information 16A and log information 16B.

The user management information 16A may include information on the user who uses the image processor 10, i.e., user information IU, that is registered with the user management information 16A.

FIG. 3 illustrates an example of a configuration of the user management information 16A. The user management information 16A may include pieces of information on the user name UN, the password PW, the terminal identification information ID, a user type UT, and use authority information IA. The use authority information IA may be information on authority for use. The user name UN, the password PW, the terminal identification information ID, the user type UT, and the use authority information IA may be stored as user information IU in association with each other.

The user name UN may be a name directed to identification of the user who uses the image processor 10, and be so set as to avoid duplication of name. The password PW stored in the user management information 16A may be, for example but not limited to, any of: a password set by the user as it is; a coded version of the password set by the user; and a hash value of the password set by the user.

The terminal identification information ID may be identification information directed to identification of the mobile terminal that performs communication between the image processor 10 and the mobile terminal, e.g., the smartphone 40. In another example embodiment, the terminal identification information ID may be a hash value of a media access control (MAC) address of a wireless network interface 42 described later of the smartphone 40. Moreover, in one example embodiment, a server that issues the terminal identification information ID may be provided on the Internet, and the terminal identification information ID may be acquired from the server.

The user type UT may indicate whether the user is an administrator or a regular user. In this example, the user type UT may be set to "A" when the user is the administrator, and the user type UT may be set to "U" when the user is the regular user.

The use authority information IA may indicate whether to permit the user to use each function of the image processor 10. Setting the use authority information IA may make it possible, for example, to permit one user to use a "print" function and a "copy" function and to prohibit the user from using a "scan" function and a "facsimile" function. Further, the setting of the use authority information IA may make it possible to permit one user to execute monochrome printing and prohibit the user from executing color printing.

In this example, one piece of the user information IU may include the user name UN set to "admin", the password PM set to "pass_admin", the user type UT set to "A" indicating the administrator, the terminal identification information ID of the mobile terminal belonging to the relevant user, and use authority information IA1 of the relevant user. In a similar manner, another piece of the user information IU may include, for example but not limited to, the user name UN set to "user1", the password PW set to "pass_1", the user type UT set to "U" indicating the regular user, the terminal identification information ID of the mobile terminal belonging to the relevant user, and use authority information IA2 of the relevant user.

In one example embodiment, the user management information 16A may be editable only by the administrator. For example, the user name UN of the administrator and the password PW of the administrator may be registered with the user management information 16A in an initial state. In this case, the administrator may input the registered user name UN and the registered password PW, and then register another user, who uses the image processor 10, with the user management information 16A.

The log information 16B may be a process history of the image processor 10. The log information 16B may include, for example but not limited to, pieces of information on the user name UN, a job name, a content of the process, date and time of execution of the process, and any other piece of information that is related to the process.

The image reader 17 illustrated in FIG. 1 may read information printed on a read medium such as paper. The image reader 17 may include, for example but not limited to, a contact image sensor (CIS). The image forming unit 18 may form an image on a recording medium such as paper, for example but not limited to, by an electrophotographic method.

The controller 19 may control an operation of each block in the image processor 10 by executing various programs. The controller 19 may include, for example but not limited to, a central processing unit (CPU), a random access memory (RAM), or any other device.

Figure 4:
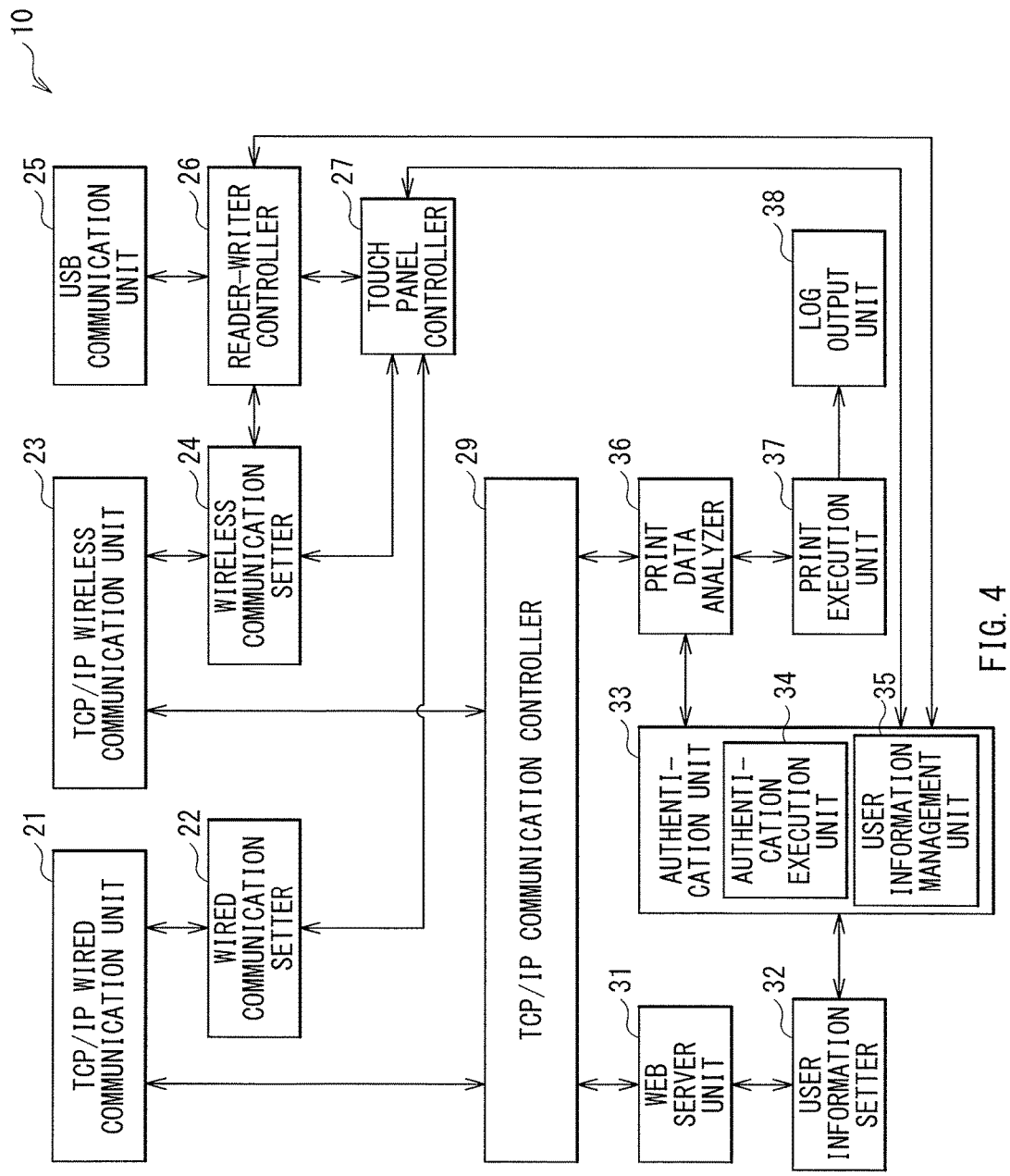
FIG. 4 is a block diagram illustrating an example of a software configuration of an image processor illustrated in FIG. 1.

FIG. 4 illustrates an example of a software configuration, of the image processor 10, which relates to a software that achieves a function of image formation on the recording medium based on the print data DP. The image processor 10 may include a transmission control protocol/Internet protocol (TCP/IP) wired communication unit 21, a wired communication setter 22, a TCP/IP wireless communication unit 23, a wireless communication setter 24, a TCP/IP communication controller 29, a USB communication unit 25, a reader-writer controller 26, a touch panel controller 27, a web server unit 31, a user information setter 32, an authentication unit 33, a print data analyzer 36, a print execution unit 37, and a log output unit 38.

The TCP/IP wired communication unit 21 may perform communication between the personal computer 9 and the TCP/IP wired communication unit 21 by means of the wired network interface 11. The wired communication setter 22 may perform network setting directed to the communication by the TCP/IP wired communication unit 21, and manage the network setting.

The TCP/IP wireless communication unit 23 may perform communication between the smartphone 40 and the TCP/IP wireless communication unit 23, i.e., the wireless network communication C2, by means of the wireless network interface 12. The wireless communication setter 24 may perform network setting directed to the communication by the TCP/IP wireless communication unit 23, and manage the network setting. The wireless communication setter 24 may store the network setting information IN. The network setting information IN may be directed to establishment, by the smartphone 40, of the connection between the TCP/IP wireless communication unit 23 and the smartphone 40 by means of the wireless network communication C2 when the TCP/IP wireless communication unit 23 operates as an access point. The network setting information IN may include, for example but not limited to, pieces of information on a service set identifier (SSID), a password, a type of security, and an Internet protocol (IP) address.

The TCP/IP communication controller 29 may manage communication between the image processor 10 and an external device by controlling communication operations performed by the TCP/IP wired communication unit 21 and the TCP/IP wireless communication unit 23.

The USB communication unit 25 may perform communication between the reader-writer 8 and the USB communication unit 25 by means of the USB interface 13.

The reader-writer controller 26 may control a communication operation performed by means of the near field communication C1 between the reader-writer 8 and the smartphone 40. When the terminal identification information ID is received from the smartphone 40, the reader-writer controller 26 may supply the received terminal identification information ID to the authentication unit 33 and make a request for the authentication process to the authentication unit 33. When the wireless information request flag F indicating "ON" is supplied from the smartphone 40, the reader-writer controller 26 may acquire the network setting information IN from the wireless communication setter 24, and supply the acquired network setting information IN to the smartphone 40. The reader-writer controller 26 may also have a function of giving the touch panel controller 27 an instruction for screen display on the basis of a result of the communication between the smartphone 40 and the reader-writer controller 26. In one specific but non-limiting example, on a condition that the wireless information request flag F indicating "OFF" is supplied from the smartphone 40 when the touch panel 15 of the image processor 10 displays the authentication waiting screen 110 illustrated in FIG. 2A, the reader-writer controller 26 may notify the touch panel controller 27 of the supply of the wireless information request flag F indicating "OFF". This may cause the touch panel controller 27 to switch the display screen of the touch panel 15 from the authentication waiting screen 110 to the menu screen 120 illustrated in FIG. 2B.

The touch panel controller 27 may give the touch panel 15 an instruction for screen display. The touch panel controller 27 may also pass the information on the user's operation received by the touch panel 15 to various programs to be executed by the image processor 10. For example, on a condition that the user operates the touch panel 15 to thereby input the user name UN and the password PW when the touch panel 15 displays the authentication waiting screen 110 illustrated in FIG. 2A, the touch panel controller 27 may supply the inputted user name UN and the inputted password PW to the authentication unit 33 to thereby make a request for the authentication process to the authentication unit 33. When the authentication process is successful, the touch panel controller 27 may give the touch panel 15 an instruction for switching the display screen on the touch panel 15 from the authentication waiting screen 110 to the menu screen 120 illustrated in FIG. 2B. Alternatively, for example, on a condition that the reader-writer controller 26 receives, from the smartphone 40, the wireless information request flag F indicating "OFF" when the touch panel 15 displays the authentication waiting screen 110 illustrated in FIG. 2A, the touch panel controller 27 may switch the display screen of the touch panel 15 from the authentication waiting screen 110 to the menu screen 120.

The web server unit 31 may provide a web page by means of hypertext transfer protocol (HTTP). The web page may be directed to setting of the image processor 10 by the user such as the administrator. This may allow the user to perform the setting of the image processor 10 by starting up the web browser and accessing the provided web page, for example but not limited to, by means of the personal computer 9.

The user information setter 32 may make a request, to the authentication unit 33, for editing the user management information, on the basis of the information inputted by the user such as the administrator by means of the web page directed to the setting of the image processor 10. Specifically, the user information setter 32 may supply the authentication unit 33 with the user name UN and the password PW both inputted by means of the web page, and thereby make the request for the authentication process to the authentication unit 33. Further, when the authentication process is successful, the user information setter 32 may make the request, to the authentication unit 33, for editing the user management information 16A, on the basis of the information inputted by means of the web page.

It is to be noted that, although the setting of the image processor 10 may be performed by means of the web page in this example, the way of performing the setting of the image processor 10 is not limited thereto. In one alternative example embodiment, a utility software directed to the setting of the image processor 10 may be installed on the personal computer 9, and the user may perform the setting of the image processor 10 by means of the installed utility software. In another alternative example embodiment, the user may perform the setting of the image processor 10 by directly operating the touch panel 15.

The authentication unit 33 performs the authentication process. The authentication unit 33 may include an authentication execution unit 34 and a user information management unit 35.

For example, when the terminal identification information ID is supplied from the reader-writer controller 26, the authentication execution unit 34 may perform the authentication process with the use of the user management information 16A on the basis of the supplied terminal identification information ID. Specifically, for example, the authentication process may be successful when the user management information 16A involves registration of the user information IU including the supplied terminal identification information ID. In contrast, for example, the authentication process may not be successful when the user management information 16A involves no registration of the user information IU including the supplied terminal identification information ID. Further, for example, when the user name UN and the password PW are supplied from the touch panel controller 27, the authentication execution unit 34 may perform the authentication process with the use of the user management information 16A on the basis of the supplied user name UN and the supplied password PW. Specifically, for example, the authentication process may be successful when the user management information 16A involves registration of the user information IU including the supplied user name UN and the supplied password PW. In contrast, the authentication process may not be successful when the user management information 16A involves no registration of the user information IU including the supplied user name UN and the supplied password PW. Moreover, the authentication execution unit 34 may also have a function of confirming, with the use of the user management information 16A, whether the user has the authority for using each function.

The user information management unit 35 may edit the user management information 16A on the basis of the request for editing made by the user information setter 32.

It is to be noted that, although the authentication unit 33 performing the authentication process is provided in the image processor 10 in this example, a configuration directed to performing the authentication process is not limited thereto. In one alternative example embodiment, a lightweight directory access protocol (LDAP) server that performs the authentication process may be provided on the Internet, and the LDAP server may perform the authentication process.

The print data analyzer 36 may analyze the print data DP supplied from the TCP/IP communication controller 29. Specifically, when the print data DP includes the terminal identification information ID, the print data analyzer 36 may supply the terminal identification information ID to the authentication unit 33, and make a request for the authentication process to the authentication unit 33. Alternatively, when the print data DP includes the user name UN and the password PW, the print data analyzer 36 may supply the user name UN and the password PW to the authentication unit 33, and make the request for the authentication process to the authentication unit 33. Further, on a condition that the authentication process is successful and the user has the authority for using the "print" function, the print data analyzer 36 may supply the print data DP to the print execution unit 37.

The print execution unit 37 may perform printing by controlling an operation of the image forming unit 18 on the basis of the print data DP supplied from the print data analyzer 36.

The log output unit 38 may update the log information 16B on the basis of a result of a process performed by the print execution unit 37.

[Smartphone 40]

Figure 5:
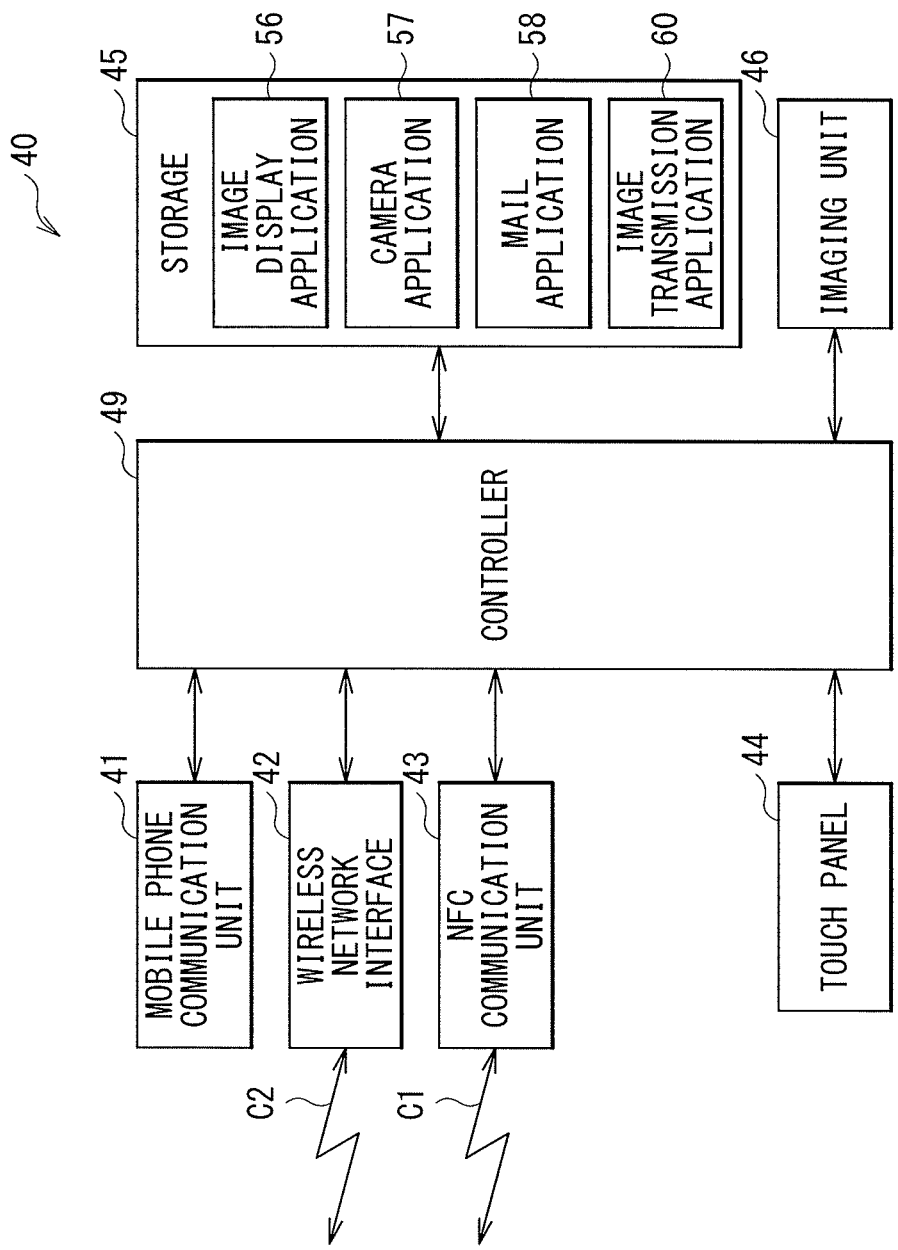
FIG. 5 is a block diagram illustrating an example of a configuration of a smartphone illustrated in FIG. 1.

FIG. 5 illustrates an example of a configuration of the smartphone 40. The smartphone 40 may include a mobile phone communication unit 41, a wireless network interface 42, an NFC communication unit 43, a touch panel 44, a storage 45, an imaging unit 46, and a controller 49.

The mobile phone communication unit 41 may perform wireless communication between a mobile phone base station and the mobile phone communication unit 41, for example. The wireless network interface 42 may perform communication between the image processor 10 and the wireless network interface 42 by means of the wireless network communication C2. The NFC communication unit 43 may perform communication between the reader-writer 8 and the NFC communication unit 43 by means of the near field communication C1. The touch panel 44 may include, for example but not limited to, a liquid crystal display and a touch sensor. The touch panel 44 may display a content of the process to be performed by the smartphone 40 or any other content, and receive an operation by the user.

The storage 45 may include, for example but not limited to, a non-volatile memory. The storage 45 may store, for example but not limited to, an operating system, various control programs, and various application programs. In this example, an image display application 56, a camera application 57, a mail application 58, and an image transmission application 60 may be installed on the smartphone 40. The foregoing applications will be described later in greater detail.

The imaging unit 46 may capture an image such as a still image and a moving image. The imaging unit 46 may include, for example but not limited to, a complementary metal-oxide-semiconductor (CMOS) image sensor.

The controller 49 may control an operation of each block in the smartphone 40 by executing the various programs. The controller 49 may include, for example but not limited to, a CPU and a RAM.

Figure 6:
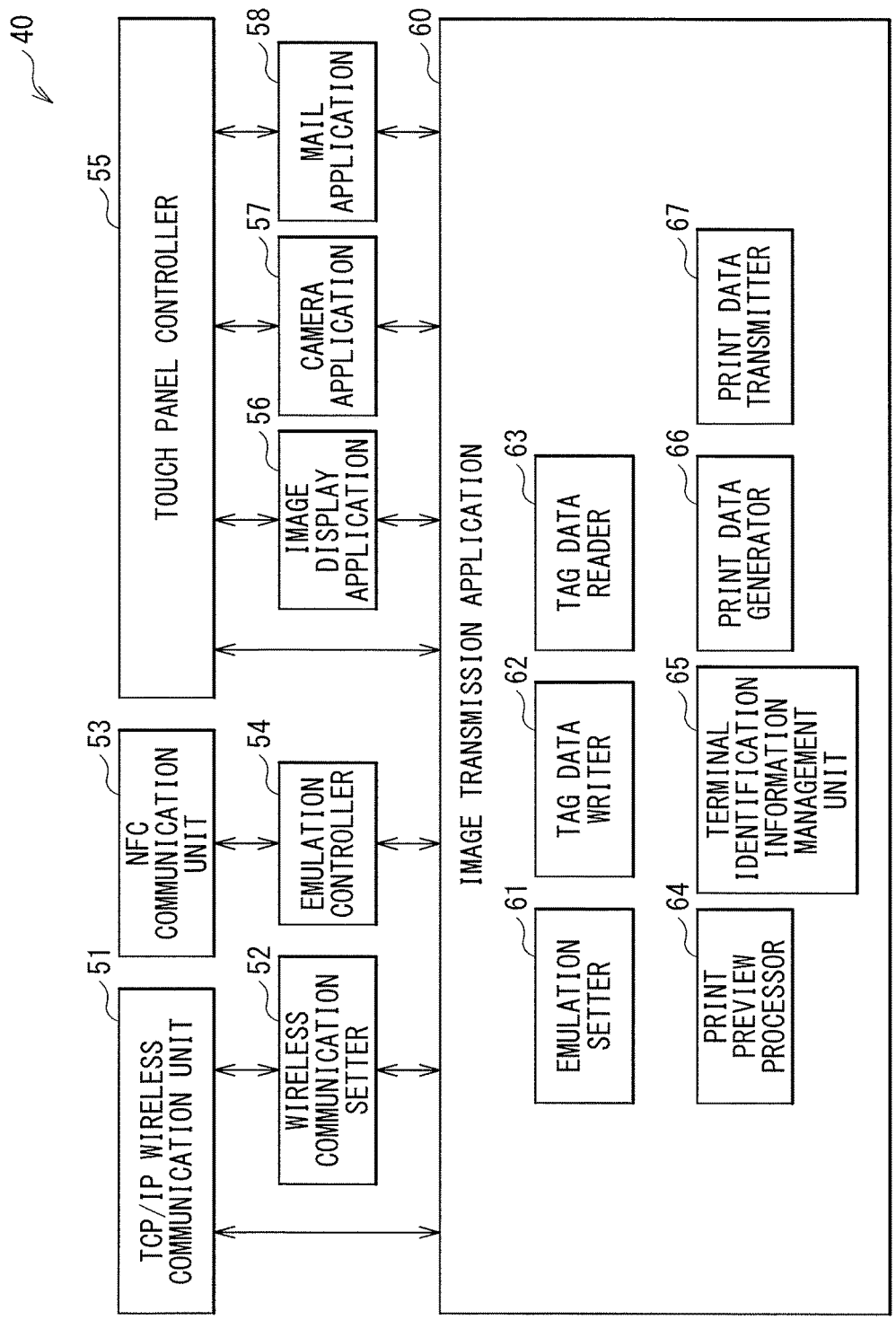
FIG. 6 is a block diagram illustrating an example of a software configuration of the smartphone illustrated in FIG. 5.

FIG. 6 illustrates an example of a software configuration of the smartphone 40. The smartphone 40 may include a TCP/IP wireless communication unit 51, a wireless communication setter 52, an NFC communication unit 53, an emulation controller 54, a touch panel controller 55, the image display application 56, the camera application 57, the mail application 58, and the image transmission application 60.

The TCP/IP wireless communication unit 51 may perform communication between the image processor 10 and the TCP/IP wireless communication unit 51, i.e., the wireless network communication C2, by means of the wireless network interface 42. The wireless communication setter 52 may perform network setting directed to the communication by the TCP/IP wireless communication unit 51, and manage the network setting. For example, when the network setting information IN is supplied from the image transmission application 60, the wireless communication setter 52 may perform the network setting on the basis of the supplied network setting information IN.

The NFC communication unit 53 may perform communication between the reader-writer 8 and the NFC communication unit 53 by means of the near field communication C1. The emulation controller 54 may so control an operation of the NFC communication unit 53 that the smartphone 40 behaves as a so-called NFC tag.

The touch panel controller 55 may give the touch panel 44 an instruction for screen display. The touch panel controller 55 may also pass information on the user operation received by the touch panel 44, to the various programs to be executed by the smartphone 40.

The image display application 56 may be a general-purpose application program that displays an image on the touch panel 44 of the smartphone 40. The camera application 57 may be a general-purpose application program that controls an operation of the imaging unit 46 of the smartphone 40. The camera application 57 may also have a function of storing the captured image in the storage 45, and administrating the image that has been captured in the past. The captured image and the image that has been captured in the past may include the still image and the moving image. The mail application 58 may be a general-purpose application program that performs transmission and reception of an electronic mail.

The image transmission application 60 may be an application program directed to transmitting the print data DP to the image processor 10 by means of the wireless network communication C2. The image transmission application 60 may include an emulation setter 61, a tag data writer 62, a tag data reader 63, a print preview processor 64, a terminal identification information management unit 65, a print data generator 66, and a print data transmitter 67.

The emulation setter 61 may register various pieces of information with the emulation controller 54 when the image transmission application 60 is installed on the smartphone 40. The various pieces of information to be registered with the emulation controller 54 may include, for example but not limited to, a type of an NFC tag to be emulated in the smartphone 40.

The tag data writer 62 may write data into the NFC tag emulated in the smartphone 40. Specifically, for example, the tag data writer 62 may write the terminal identification information ID and the wireless information request flag F into the NFC tag.

The tag data reader 63 may read data from the NFC tag emulated in the smartphone 40. Specifically, for example, the tag data reader 63 may read the network setting information IN from the NFC tag. Further, the tag data reader 63 may supply the read network setting information IN to the wireless communication setter 52.

The print preview processor 64 may display, as a printing target image, a preview of the image selected by the user on the touch panel 44, on the basis of an instruction given by the touch panel controller 55. The print preview processor 64 may also have a function of allowing the user to set printing parameters such as the number of printing copies and a size of the recording medium.

The terminal identification information management unit 65 may manage the terminal identification information ID of the smartphone 40. The terminal identification information management unit 65 may also have a function of displaying the terminal identification information ID on the touch panel 44, on the basis of the instruction given by the touch panel controller 55.

The print data generator 66 may generate the print data DP on the basis of the image displayed as the preview by the print preview processor 64, and the printing parameters set by the user.

The print data transmitter 67 may transmit the print data DP to the image processor 10 by means of the wireless network communication C2 by controlling an operation of the TCP/IP wireless communication unit 51.

The reader-writer controller 26 may correspond to an "information acquiring circuitry" in one specific but non-limiting embodiment of the technology. The authentication unit 33 may correspond to an "authentication circuitry" in one specific but non-limiting embodiment of the technology. The reader-writer 8 may correspond to a "first communicator" in one specific but non-limiting embodiment of the technology. The wireless network interface 12 may correspond to a "second communicator" in one specific but non-limiting embodiment of the technology. The smartphone 40 may correspond to a "mobile terminal" in one specific but non-limiting embodiment of the technology. The touch panel 15 may correspond to a "display" in one specific but non-limiting embodiment of the technology. The controller 19 may correspond to a "controller" in one specific but non-limiting embodiment of the technology. The menu screen 120 may correspond to a "first post-authentication screen" and a "second post-authentication screen" in one specific but non-limiting embodiment of the technology. The print data DP may correspond to "image data" in one specific but non-limiting embodiment of the technology. The wireless information request flag F may correspond to "status information" in one specific but non-limiting embodiment of the technology. The terminal identification information ID may correspond to "identification information" in one specific but non-limiting embodiment of the technology. The user name UN and the password PW may correspond to "authentication information" in one specific but non-limiting embodiment of the technology.

[Operations and Workings]

A description is given below of operations and workings of the image processing system 1 according to the present example embodiment.

[Overview of Overall Operation]

A description is first given of an overview of an overall operation of the image processing system 1, with reference to FIG. 1. For example, when the user inputs the user name UN and the password PW while the touch panel 15 of the image processor 10 displays the authentication waiting screen 110 illustrated in FIG. 2A, the image processor 10 may perform the authentication process on the basis of the user name UN and the password PW both inputted by the user. Further, when the authentication process is successful, the image processor 10 may switch the display screen of the touch panel 15 from the authentication waiting screen 110 to the menu screen 120 illustrated in FIG. 2B. Further, the user may operate any of the function icons 121 and select a function which the user intends to use. In response to the operation of any of the function icons 121 by the user, the image processor 10 may perform a process on the basis of an instruction given by the user. Further, the image processer 10 may perform the logout process in response to the operation of the "logout" button 122 by the user.

Moreover, for example, when the image processor 10 receives the print data DP supplied from the personal computer 9 via the wired network NET, the image processor 10 may form the image on the recording medium on the basis of the received print data DP. Specifically, for example, when the print data DP includes the user name UN and the password PW, the image processor 10 may perform the authentication process on the basis of the user name UN and the password PW. Further, on a condition that the authentication process is successful and the user has the authority for using the "print" function, the image processor 10 may form the image on the recording medium on the basis of the print data DP.

Moreover, for example, on a condition that the smartphone 40 is held over the reader-writer 8 and the terminal identification information ID and the wireless information request flag F are supplied from the smartphone 40 by means of the near field communication C1, the image processor 10 may perform the authentication process on the basis of the supplied terminal identification information ID. Further, when the authentication process is successful, the image processor 10 may switch the display screen of the touch panel 15 from the authentication waiting screen 110 illustrated in FIG. 2A to the menu screen 120 illustrated in FIG. 2B, or keep the authentication waiting screen 110 to be displayed as the display screen and form the image on the recording medium on the basis of the print data DP supplied from the smartphone 40 by means of the wireless network communication C2. Which operation to be performed by the image processor 10 may be determined on the basis of the wireless information request flag F.

[Editing of User Management Information 16A]

The image processing system 1 may allow the user registered with the user management information 16A to use the image processor 10. A description is given below of an operation of the image processor 10 in a case where the administrator edits the user management information 16A.

FIGS. 7A to 7C each illustrate an example of a display screen in the case where the administrator edits the user management information 16A.

First, the administrator may start up the web browser on the personal computer 9, and input a predetermined uniform resource identifier (URI). This may cause the web server unit 31 of the image processor 10 to provide an administrator authentication screen 210 illustrated in FIG. 7A to the personal computer 9. As illustrated in FIG. 7A by way of example, the administrator authentication screen 210 may be provided with a user name input box 211, a password input box 212, and a "login" button 213. The administrator may input the user name UN, i.e., "admin" in this example, into the user name input box 211, input the password PW into the password input box 212, and operate the "login" button 213. In response to the foregoing input of the user name UN and the password PW by the user and the foregoing operation of the "login" button 213 by the user, the user information setter 32 of the image processor 10 may supply the inputted user name UN and the inputted password PW to the authentication unit 33, and make a request for the authentication process to the authentication unit 33. Specifically, the authentication process may be successful on a condition that the user management information 16A involves registration of the user information IN in which the inputted user name UN and the inputted password PW are included and the user type UT is set to "A". "A" for the user type UT may indicate the administrator.

When the authentication process is successful, the web server unit 31 may generate a user management screen 220 illustrated in FIG. 7B on the basis of the user management information 16A, and provide the generated user management screen 220 to the personal computer 9. In this example, the user management screen 220 may include the user information IU registered with the user management information 16A. In this example, the user information IU may include the user name UN, the user type UT, and the terminal identification information ID. Further, the user management screen 220 may be provided with an "add" button 221, a "change" button 222, and a "delete" button 223. The "add" button 221 may be used upon addition of a user. The "change" button 222 may be used upon making a change in the registered user information IU. The "delete" button 223 may be used upon deletion of a user.

For example, when the administrator operates the "add" button 221 on the user management screen 220 illustrated in FIG. 7B, the web server unit 31 may provide a user information editing screen 230 illustrated in FIG. 7C to the personal computer 9. As illustrated in FIG. 7C by way of example, the user information editing screen 230 may be provided with a user name input box 231, a password input box 232, a terminal identification information input box 233, a "user type" radio button 234, an "execute" button 235, and a "cancel" button 236. The administrator may use the user information editing screen 230 to input the user name UN, the password PW, the terminal identification information ID, and the user type UT of a user to be added. The terminal identification information ID may not be inputted yet upon the addition of the user. In a case where the terminal identification information ID is not inputted yet upon the addition of the user, the administrator may input the terminal identification information ID by making a change in the user information IU. In one example embodiment, display in the password input box 232 may be performed by means of masking with the use of a particular symbol such as an asterisk. When the administrator operates the "execute" button 235, the user information management unit 35 may register the foregoing information with the user management information 16A, and the web server unit 31 may provide the user management screen 220 illustrated in FIG. 7B to the personal computer 9. When the administrator operates the "cancel" button 236, the web server unit 31 may provide the user management screen 220 illustrated in FIG. 7B to the personal computer 9.

Moreover, for example, when the administrator checks off a check box corresponding to a user for which a change is to be made and operates the "change" button 222 on the user management screen 220 illustrated in FIG. 7B, the web server unit 31 may also provide the user information editing screen 230 illustrated in FIG. 7C to the personal computer 9, as with the case in which the user is to be added. In this case, information, of the user for which a change is to be made, that has been already registered may be displayed in each of the user name input box 231, the password input box 232, the terminal identification information input box 233, and the "user type" radio button 234. In one example embodiment, display of the password inputted into the password input box 232 may be performed by means of masking with the use of a particular symbol such as the asterisk also in this case.

When the change in the user information IU is to involve deletion, in the user management information 16A, of the user information IU including the user type UT set to "A" indicating the administrator, the image processor 10 may perform a display indicating an error and so operate as not to accept the change in the user information IU.

Moreover, for example, when the administrator checks off the check box corresponding to a user to be deleted and operates the "delete" button 223 on the user management screen 220 illustrated in FIG. 7B, the user information management unit 35 may delete, from the user management information 16A, the user information IU of the user to be deleted. Further, the web server unit 31 may generate the user management screen 220 illustrated in FIG. 7B on the basis of the latest user management information 16A, and provide the generated user management screen 220 to the personal computer 9.

[Image Transmission Application 60]

Next, a detailed description is given below of the image transmission application 60 installed on the smartphone 40.

Figure 8B:
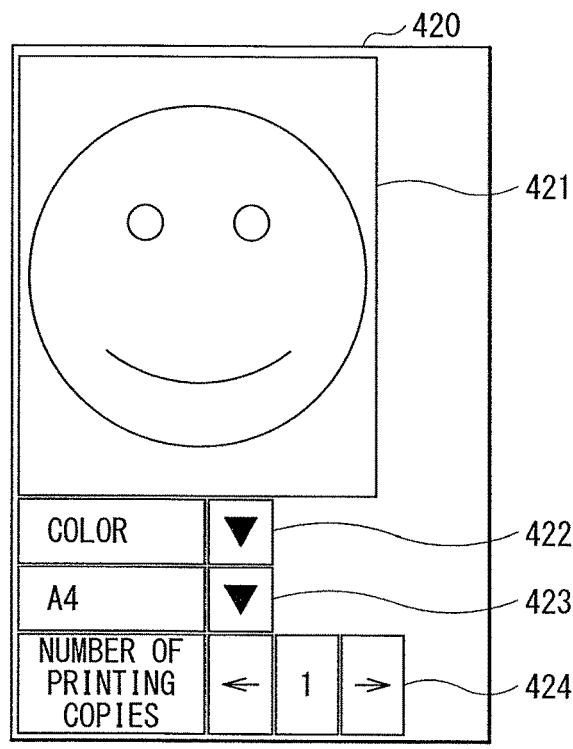
FIG. 8B describes an example of a print preview screen.
Figure 8C:
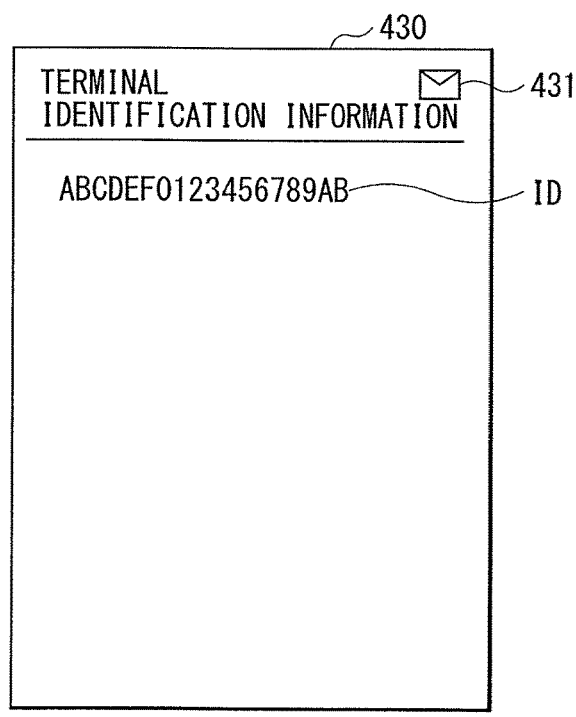
FIG. 8C describes an example of a terminal identification information display screen.

FIGS. 8A to 8C each illustrate an example of a display screen of the smartphone 40 in a case where the image transmission application 60 operates.

When the user starts up the image transmission application 60 by operating the smartphone 40, the touch panel 44 may display a home screen 410 illustrated in FIG. 8A on the basis of an instruction given by the image transmission application 60. The home screen 410 may be provided with a "file" menu 411, a "web" menu 412, a "camera" menu 413, and a "display of terminal identification information" button 414.

The user may operates any of the "file" menu 411, the "web" menu 412, and the "camera" menu 413 to thereby select an image to be printed by the image processor 10.

For example, when the user selects the "file" menu 411 on the home screen 410 illustrated in FIG. 8A, the touch panel 44 of the smartphone 40 may display, for example but not limited to, a list of image files stored in the storage 45. Further, when the user selects any of the image files, the touch panel 44 may display a print preview screen 420 illustrated in FIG. 8B, on the basis of an instruction given by the print preview processor 64 of the image transmission application 60. On the print preview screen 420, a preview image 421 related to the selected image file may be displayed. The print preview screen 420 may be also provided with a "color classification" pull-down menu 422, a "recording medium size" pull-down menu 423, and a number-of-printing-copies changing button 424. The user may be allowed to set the printing parameters by operating the "color classification" pull-down menu 422, the "recording medium size" pull-down menu 423, and the number-of-printing-copies changing button 424.

Moreover, for example, when the user selects the "web" menu on the home screen 410 illustrated in FIG. 8A, the touch panel 44 may display, for example but not limited to, a screen directed to input of the URI. When the user inputs the URI, the touch panel 44 may display the print preview screen 420 illustrated in FIG. 8B, on the basis of the instruction given by the print preview processor 64. In this case, a web page corresponding to the inputted URI may be displayed as the preview image 421.

Moreover, for example, when the user selects the "camera" menu on the home screen 410 illustrated in FIG. 8A, the camera application 57 may be started up. Further, when the user operates the camera application 57 to capture an image, the touch panel 44 may display the print preview screen 420 illustrated in FIG. 8B, on the basis of the instruction given by the print preview processor 64. In this case, the captured image may be displayed as the preview image 421.

Although the print preview screen 420 is displayed by means of the three menus illustrated in FIG. 8A in this example, a way of displaying the print preview screen 420 is not limited thereto. In an alternative example embodiment, the print preview screen 420 illustrated in FIG. 8B may be displayed by selecting an image by means of the image display application 56 and designating the image transmission application 60 to perform a sharing operation. In this example case, the image selected by means of the image display application 56 may be displayed as the preview image 421.

In a period of time during which the touch panel 44 of the smartphone 40 displays the print preview screen 420 illustrated in FIG. 8B as described above, the tag data writer 62 may write the terminal identification information ID and the wireless information request flag F indicating "ON" into the NFC tag emulated in the smartphone 40. When the user holds the smartphone 40 over the reader-writer 8, the image processor 10 may perform the authentication process on the basis of the terminal identification information ID. Further, when the authentication process is successful, the image processor 10 may write the network setting information IN into the NFC tag with the use of the reader-writer 8, on the basis of the wireless information request flag F indicating "ON". The tag data reader 63 of the smartphone 40 may read the written network setting information IN, and the wireless communication setter 52 may perform the network setting on the basis of the read network setting information IN.

Thereafter, the print data generator 66 of the smartphone 40 may generate the print data DP on the basis of image data related to the preview image 421 displayed on the print preview screen 420 illustrated in FIG. 8B and the printing parameters set on the print preview screen 420.

Figure 9:
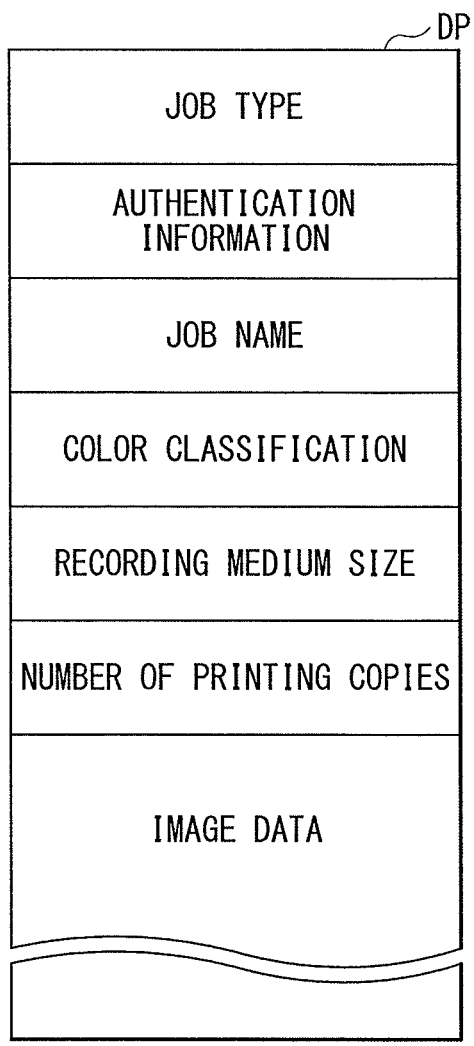
FIG. 9 describes an example of print data.

FIG. 9 illustrates an example of the print data DP. The print data DP may include a "job type", "authentication information", a "job name", a "recording medium size", "number of printing copies", and "image data".

The "job type" may be set to, for example but not limited to, any of a regular job J1, an authentication job J2, and an authentication job J3. The regular job J1 may perform printing without performing the authentication process. The authentication job J2 may perform printing by performing the authentication process with the use of the user name UN and the password PW. The authentication job J3 may perform printing by performing the authentication process with the use of the terminal identification information ID.

In a case where an image processor configured not to perform the authentication process receives the print data DP having the "job type" set to the regular job J1, the image processor may form an image on the basis of the received print data DP. In a case where the such an image processor receives the print data DP having the "job type" set to one of the authentication jobs J2 and J3, the image processor may discard the received print data DP and perform no image formation.

In a case where an image processor configured to perform the authentication process receives the print data DP having the "job type" set to the regular job J1, the image processor may discard the received print data DP and perform no image formation. In a case where such an image processor receives the print data DP having the "job type" set to one of the authentication jobs J2 and J3, the image processor may form an image on the basis of the received print data DP upon success of the authentication process, and may discard the received print data DP and perform no image formation upon failure of the authentication process.

The user name UN may be set to the "authentication information", for example, when the "job type" is set to the regular job J1. The user name UN set to the "authentication information" may be used, for example, upon generation of log information. Alternatively, the user name UN and the password PW may be set to the "authentication information", for example, when the "job type" is set to the authentication job J2. Alternatively, the terminal identification information ID may be set to the "authentication information", for example, when the "job type" is set to the authentication job J3. In one example embodiment, the "authentication information" may be coded when the "job type" is set to one of the authentication jobs J2 and J3.

The "job name" may be set on the basis of, for example but not limited to, any of: a file name of an original file used upon generation of the print data DP; and a date of generation of the print data DP. The "job name" may be used upon the generation of the log information, for example.

The "recording medium size" and the "number of printing copies" may be set in accordance with the contents set on the print preview screen 420 illustrated in FIG. 8B.

The "image data" may be data of an image to be printed. As the "image data", image data may be in which color information is changed in accordance with the "color classification" set on the print preview screen 420 illustrated in FIG. 8 and an image size is changed in accordance with the "recording medium size" set on the print preview screen 420.

The print data generator 66 may generate the print data DP as described above. Thereafter, the print data transmitter 67 may supply the generated print data DP to the image processor 10. The image processor 10 may perform the authentication process on the basis of the "authentication information". On a condition that the authentication process is successful and the user has the authority for using the "print" function, the image processor 10 may form the image on the recording medium on the basis of the supplied print data DP.

In contrast, in a period of time during which the touch panel 44 does not display the print preview screen 420 illustrated in FIG. 8B, the tag data writer 62 may write the terminal identification information ID and the wireless information request flag F indicating "OFF" into the NFC tag emulated in the smartphone 40. When the user holds the smartphone 40 over the reader-writer 8, the image processor 10 may perform the authentication process on the basis of the terminal identification information ID. Further, when the authentication process is successful, the image processor 10 may switch the display screen of the touch panel 15 from the authentication waiting screen 110 illustrated in FIG. 2A to the menu screen 120 illustrated in FIG. 2B, on the basis of the wireless information request flag F indicating "OFF". Further, the user may operate any of the function icons 121 to thereby select the function which the user intends to use. In response to the operation of any of the function icons 121 by the user, the image processor 10 may perform the process on the basis of the instruction given by the user.

Moreover, for example, when the user operates the "display of terminal identification information" button 414 on the home screen 410 illustrated in FIG. 8A, the touch panel 44 may display a terminal identification information display screen 430 illustrated in FIG. 8C, on the basis of an instruction given by the terminal identification information management unit 65 of the image transmission application 60. On the terminal identification information display screen 430 illustrated in FIG. 8C, the terminal identification information ID of the smartphone 40 may be displayed. The user may pass the displayed terminal identification information ID to the administrator of the image processor 10. Thereafter, the administrator may register the terminal identification information ID with the user management information 16A by operating the user information editing screen 230 illustrated in FIG. 7C. Thus, the terminal identification information ID may be registered with the user management information 16A.

Moreover, in this example, the terminal identification information display screen 430 may be provided with a "mail" icon 431. In response to an operation of the "mail" icon 431 by the user, the mail application 58 may be started up. Further, for example, a mail including a description related to the terminal identification information ID of the smartphone 40 may be created as a text of the mail. The user may send the mail to the administrator of the image processor 10, and thereby make, for example but not limited to, a request for addition of a user, a request for registration of the terminal identification information ID, or any other request.

[Emulation Operation]

When the image transmission application 60 is installed on the smartphone 40, the emulation setter 61 of the image transmission application 60 may register, with the emulation controller 54, various pieces of information on the NFC tag to be emulated in the smartphone 40. This may cause the image transmission application 60 installed on the smartphone 40 and the emulation controller 54 to operate as an NFC data encoding format (NDEF) tag application 70.

Figure 10:
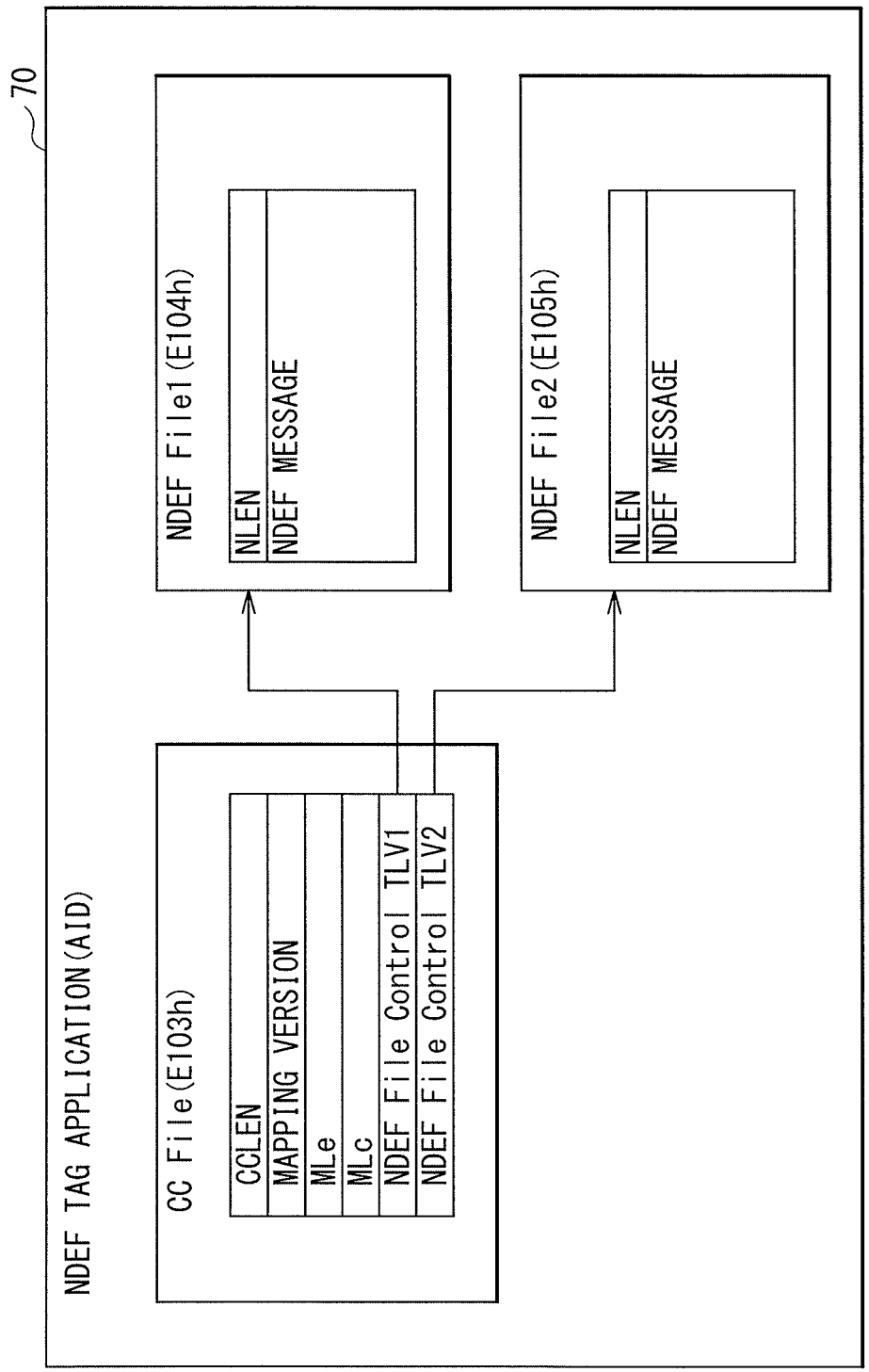
FIG. 10 describes an example of an NDEF tag application.

FIG. 10 schematically illustrates the NDEF tag application 70. It is to be noted that, although an "NFC Forum Type 4 Tag" of tags defined by the NFC forum is used in this example, a tag to be used is not limited thereto. In one alternative example embodiment, any other tag may be used.

The NDEF tag application 70 may be attached with application identification information (application identifier) AID that is unique to the NDEF tag application 70 and is not a duplicate application identification information in any other application program. The NDEF tag application 70 may include a "CC (Capability Container) File" that indicates information on the NDEF tag. The "CC File" may include a "CCLEN" filed, a "mapping version" field, an "MLe" field, an "MLc" filed, an "NDEF File Control TLV1" field, and an "NDEF File Control TLV2" field. The "CCLEN" field may store the size of the "CC File". An upper nibble of the "mapping version" field may store a major version number of mapping version numbers. A lower nibble of the "mapping version" field may store a minor version number of the mapping version numbers. The "MLe" field may store the maximum data size that is readable in one command. The "MLc" field may store the maximum data size that is writable in one command. The "NDEF File Control TLV1" field may store an "NDEF File1". The "NDEF File Control TLV2" field may store an "NDEF File2".

The "NDEF File1" may be read by the reader-writer 8. The "NDEF File1" may include an "NLEN" field and an "NDEF message" field. The "NLEN" field may store the size of an NDEF message of the "NDEF File1". Into the "NDEF message" filed, data, i.e., the NDEF message, supplied by the smartphone 40 to the image processor 10 may be written by the tag data writer 62 of the image transmission application 60. The data supplied by the smartphone 40 to the image processor 10 may include a plurality of records.

Figure 11:
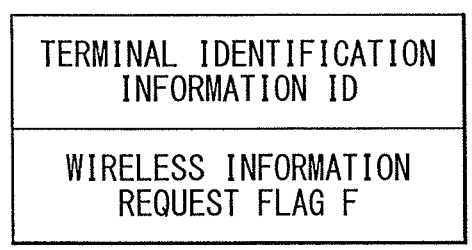
FIG. 11 describes an example of an NDEF message of "NDEF File1".

FIG. 11 illustrates an example of the NDEF message of the "NDEF File1". The NDEF message may include a "terminal identification information ID" record and a "wireless information request flag F" record. The "terminal identification information ID" record may store the terminal identification information ID in a text format. The "wireless information request flag F" record may store "ON" or "OFF" in the text format.

The "NDEF File2" may be subjected to writing by the reader-writer 8. The "NDEF File2" may include an "NLEN" field and an "NDEF message" field. The "NLEN" filed may store the size of the NDEF message of the "NDEF File2". Into the "NDEF message" filed, data, i.e., the NDEF message, supplied by the image processor 10 to the smartphone 40 may be written by the reader-writer 8. The data supplied by the image processor 10 to the smartphone 40 may include a plurality of records.

Figure 12:
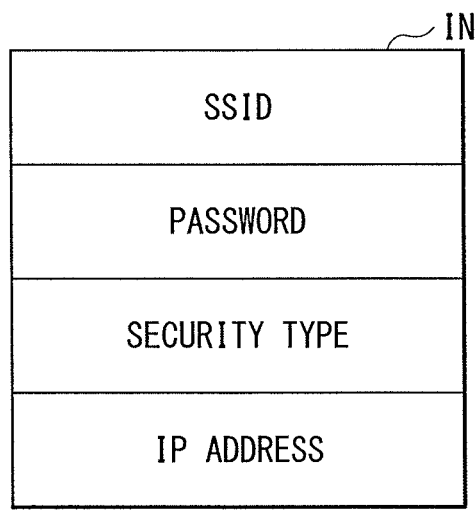
FIG. 12 describes an example of an NDEF message of "NDEF File2".

FIG. 12 illustrates an example of the NDEF message of the "NDEF File2". The NDEF message may include an "SSID" record, a "password" record, a "security type" record, and an "IP address" record. In other words, each of the foregoing records may store the network setting information IN. Specifically, the "SSID" record may store, in the text format, an SSID that is used when the image processor 10 operates as an access point of the wireless network communication C2. The "password" record may store the password to be used when the smartphone 40 establishes the connection between the image processor 10 and the smartphone 40 by means of the wireless network communication C2. The "security type" record may store an encoding scheme to be used upon the wireless network communication C2. Non-limiting examples of the encoding scheme may include Wi-Fi protected access 2 (WPA2) and temporal key integrity protocol (TKIP). The "IP address" field may store the IP address of the image processor 10 in the wireless network communication C2.

The image processor 10 may so perform a control that the reader-writer 8 performs the writing of the network setting information IN illustrated in FIG. 12, on a condition that: the terminal identification information ID and the wireless information request flag F indicating "ON" are supplied from the smartphone 40; the authentication process is performed on the basis of the supplied terminal identification information ID; and the authentication process is successful.

[Operation Example OP1]

A description is given next of an operation of the image processing system 1 in a case where the smartphone 40 is held over the reader-writer 8 and the smartphone 40 supplies the print data DP to the image processor 10 while the authentication waiting screen 110 is kept displayed as the display screen.

Figure 13A:
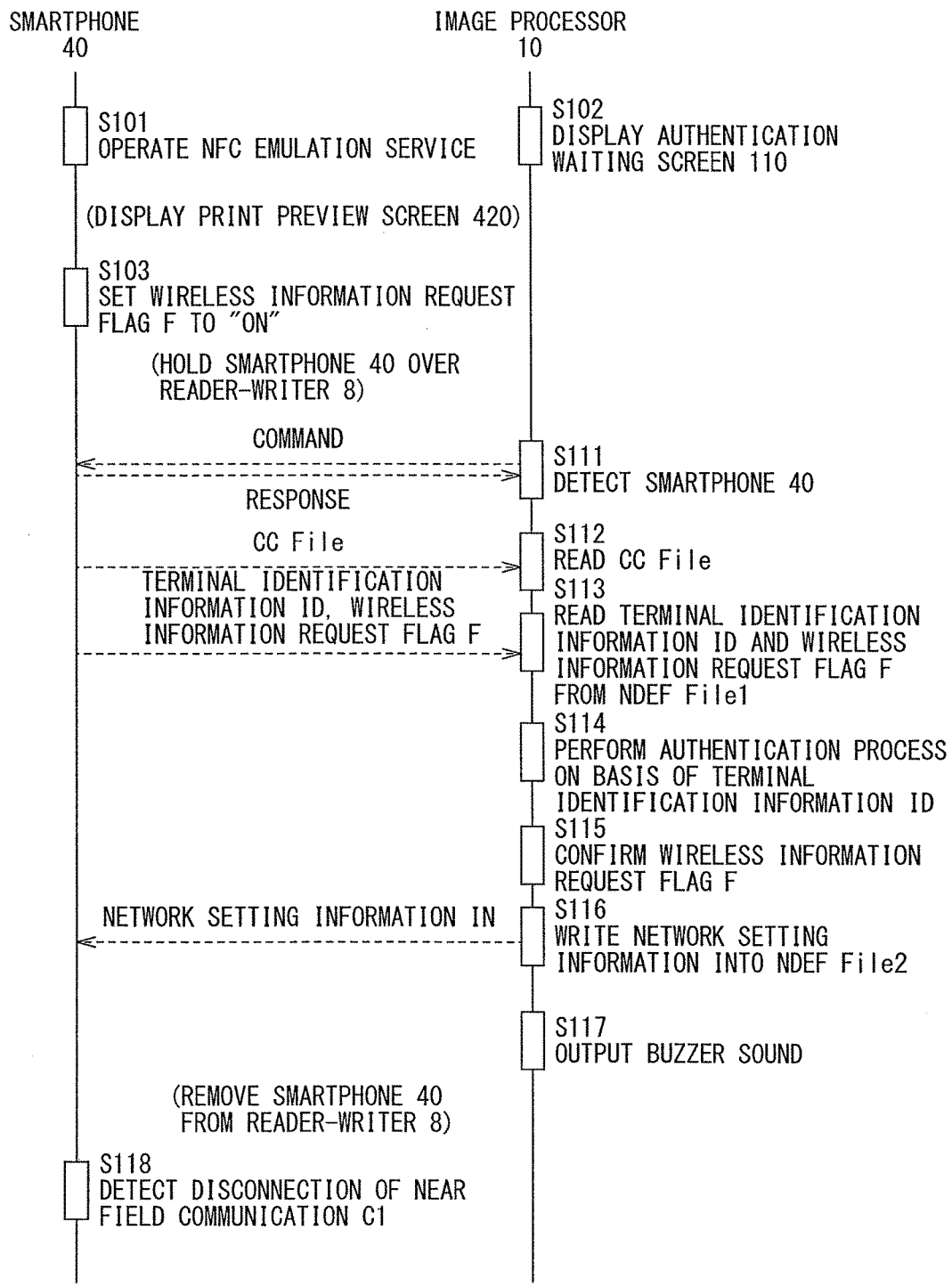
FIG. 13A is a sequence diagram illustrating an example of an operation of the image processing system illustrated in FIG. 1.
Figure 13B:
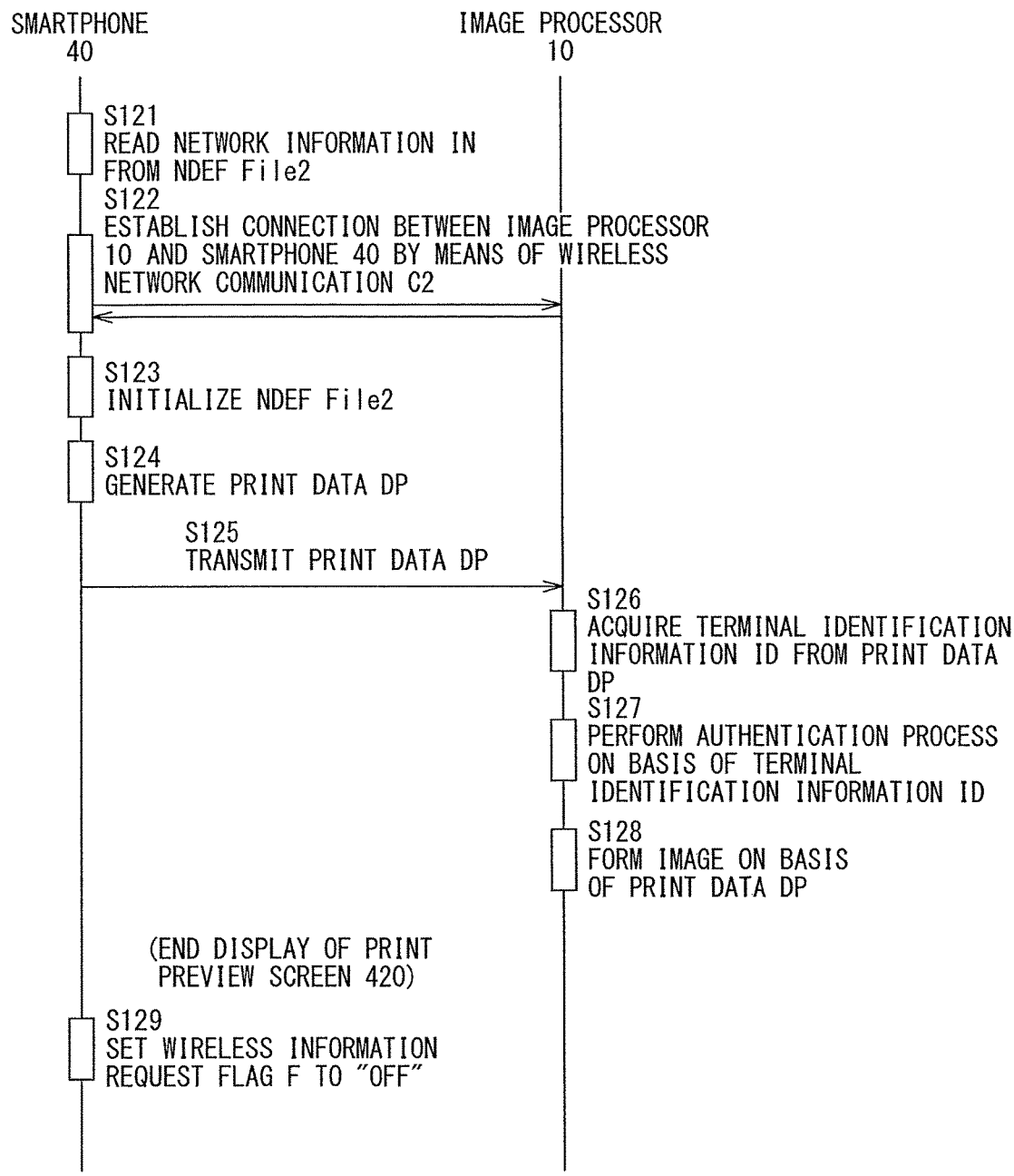
FIG. 13B is another sequence diagram illustrating the example of the operation of the image processing system illustrated in FIG. 1.

FIGS. 13A and 13B each illustrate an example of an operation of the image processing system 1 in an operation example OP1. In FIGS. 13A and 13B, a dashed-line arrow indicates communication of data by means of the near field communication C1, and a solid-line arrow indicates communication of data by means of the wireless network communication C2. A description in parentheses indicates an operation by the user.

Referring to FIG. 13A, first, an NFC emulation service may be operated in the smartphone 40 (step S101). Specifically, when the image transmission application 60 is installed on the smartphone 40, the emulation controller 54 may so control an operation of the NFC communication unit 53 that the smartphone 40 behaves as the NFC tag except for a case where the smartphone 40 is in a sleep mode. In other words, the NFC emulation service may be constantly in operation in the smartphone 40 even when the image transmission application 60 is not started up.

In the image processor 10, the touch panel 15 may display the authentication waiting screen 110 (step S102).

Thereafter, the user may operate the smartphone 40 to thereby start up the image transmission application 60. Further, the user may select the image which the user intends to print, and display the print preview screen 420 illustrated in FIG. 8B on the touch panel 44. This may cause the smartphone 40 to set the wireless information request flag F to "ON" (step S103). Specifically, the tag data writer 62 of the image transmission application 60 may write the terminal identification information ID into the "NDEF message" field of the "NDEF File1", and write the wireless information request flag F indicating "ON" into the "NDEF message" field of the "NDEF File1".

Thereafter, the user may hold the smartphone 40 over the reader-writer 8. This may allow the image processor 10 to detect the smartphone 40 (step S111). Specifically, when the smartphone 40 is brought into a communicable range of the reader-writer 8, the reader-writer controller 26 may supply the smartphone 40 with a command on the basis of a notification by the reader-writer 8. The command may select the application identification information AID of the image transmission application 60. Further, the reader-writer controller 26 may confirm whether a desired response to the command is obtainable from the smartphone 40. When the desired response is obtained from the smartphone 40, the process may proceed to a subsequent step. When the desired response is not obtained from the smartphone 40, the image processor 10 may, for example, output a buzzer sound indicating non-detection of the smartphone 40, and end the process.

Thereafter, the image processor 10 may read the "CC File" from the smartphone 40 (step S112). Specifically, the reader-writer controller 26 of the image processor 10 may select the "CC File", read the selected "CC File", and acquire the "NDEF File1" and the "NDEF File2".

Thereafter, the image processor 10 may read the terminal identification information ID and the wireless information request flag F from the "NDEF File1" (step S113). Specifically, the reader-writer controller 26 of the image processor 10 may select the "NDEF File1" of the "CC File", read the selected "NDEF File1", and acquire the terminal identification information ID and the wireless information request flag F.

Thereafter, the image processor 10 may perform the authentication process on the basis of the terminal identification information ID (step S114). Specifically, the reader-writer controller 26 of the image processor 10 may supply the authentication unit 33 with the terminal identification information ID acquired in step S113, and make a request for the authentication process to the authentication unit 33. The authentication unit 33 may perform the authentication process on the basis of the supplied terminal identification information ID. Further, the authentication unit 33 may notify a result of the authentication process to the reader-writer controller 26. When the authentication process is successful, the process may proceed to a subsequent step. When the authentication process is not successful, the image processor 10 may, for example, output a buzzer sound indicating the failure in the authentication process, and end the process.

Thereafter, the image processor 10 may confirm the wireless information request flag F (step S115). Specifically, the reader-writer controller 26 of the image processor 10 may confirm whether the wireless information request flag F acquired in step S113 indicates "ON" or "OFF".

In this example, the wireless information request flag F indicates "ON". Therefore, the image processor 10 may thereafter write the network setting information IN into the "NDEF File2" (step S116). Specifically, the reader-writer controller 26 of the image processor 10 may acquire the network setting information IN from the wireless communication setter 24. Further, the reader-writer controller 26 may select the "NDEF File2" of the "CC File", and write the network setting information IN into the selected "NDEF File2".

Thereafter, the image processor 10 may output a buzzer sound indicating that the smartphone 40 can be removed from the reader-writer 8 (step S117).

Thereafter, the user may remove the smartphone 40 from the reader-writer 8. This may cause the emulation controller 54 of the smartphone 40 to detect disconnection of the near field communication C1 (step S118).

Thereafter, referring to FIG. 13B, the smartphone 40 may read the network setting information IN from the "NDEF File2" (step S121). Specifically, the tag data reader 63 of the image transmission application 60 may read the network setting information IN that has been written into the "NDEF File2" in step S116.

Thereafter, the smartphone 40 may establish a connection between the image processor 10 and the smartphone 40 by means of the wireless network communication C2 (step S122). Specifically, the wireless communication setter 52 of the smartphone 40 may perform the network setting on the basis of the network setting information IN that has been read by the tag data reader 63 in step S121. The network setting information IN may include the SSID, the password, the security type, and the IP address. Further, the TCP/IP wireless communication unit 51 may establish a connection between a predetermined port of the image processor 10 and the TCP/IP wireless communication unit 50 by means of the wireless network communication C2. The predetermined port of the image processor 10 may be, for example but not limited to, a port 9100.

Thereafter, the smartphone 40 may delete all the information in the "NDEF File2" and initialize the "NDEF File2" for confidentiality (step S123).

Thereafter, the smartphone 40 may generate the print data DP (step S124). Specifically, the print data generator 66 of the image transmission application 60 may generate the print data DP on the basis of: the image data related to the preview image 421 on the print preview screen 420 illustrated in FIG. 8B that is displayed on the touch panel 44; the printing parameters set on the print preview screen 420; and the terminal identification information ID. In this example, the "job type" may be set to the authentication job J3, and the "authentication information" may be set to the terminal identification information ID, in the print data DP illustrated in FIG. 9.

Thereafter, the smartphone 40 may transmit the print data DP to the image processor 10 (step S125). Specifically, the print data transmitter 67 of the image transmission application 60 may transmit, to the image processor 10, the print data DP generated by the print data generator 66 in step S124, by means of the wireless network communication C2. The TCP/IP wireless communication unit 23 of the image processor 10 may receive the print data DP.

Thereafter, the image processor 10 may acquire the terminal identification information ID from the print data DP (step S126). Specifically, the print data analyzer 36 of the image processor 10 may acquire the terminal identification information ID from the "authentication information" of the print data DP illustrated in FIG. 9. In a case where the terminal identification information ID is encrypted, the terminal identification information ID may be subjected to decoding.

Thereafter, the image processor 10 may perform the authentication process on the basis of the terminal identification information ID (step S127). Specifically, the print data analyzer 36 may supply the authentication unit 33 with the terminal identification information ID acquired in step S126, and make a request for the authentication process to the authentication unit 33. The authentication unit 33 may perform the authentication process. When the authentication process is successful, the authentication unit 33 may acquire the user name UN corresponding to the terminal identification information ID, and confirm whether the user has the authority for using the "print" function. Further, when the user has the authority for using the "print" function, the authentication unit 33 may notify the print data analyzer 36 of the success in the authentication process, and notify the print data analyzer 36 of the acquired user name UN. In this case, the print data analyzer 36 may replace the terminal identification information ID set for the "authentication information" of the print data DP illustrated in FIG. 9 with the user name UN. Alternatively, in a case where the authentication process is not successful, in a case where the user unauthorized to use the "print" function, or in any other case, the authentication unit 33 may notify the print data analyzer 36 of the situation. In this case, the print data analyzer 36 may discard the print data DP. Further, the image processor 10 may output a buzzer sound and end the process. In this example, the image processor 10 has performed the authentication process on the basis of the terminal identification information ID in step S114. Therefore, the authentication process may be successful.

Thereafter, the image processor 10 may form the image on the recording medium on the basis of the print data DP (step S128). Specifically, the print execution unit 37 of the image processor 10 may control the operation of the image forming unit 18 on the basis of the print data DP supplied from the print data analyzer 36. As a result, the image processor 10 may form the image on the recording medium. Further, the print execution unit 37 may supply the log output unit 38 with the information included in the print data DP illustrated in FIG. 9. The information included in the print data DP may be, for example but not limited to, the "authentication information", i.e., the user name UN, the "job name", the "recording medium size", and the "number of printing copies". The log output unit 38 may update the log information 16B on the basis of the supplied information.

Thereafter, the user may end the display of the print preview screen 420 by operating the image transmission application 60 of the smartphone 40. This may cause the smartphone 40 to set the wireless information request flag F to "OFF" (step S129). Specifically, the tag data writer 62 of the image transmission application 60 may write the wireless information request flag F indicating "OFF" into the "NDEF message" field of the "NDEF File1".

This may bring the sequence to the end.

As described above, the image processing system 1 is able to print the image related to the print preview screen 420 illustrated in FIG. 8B while the authentication waiting screen 110 is kept displayed as the display screen of the image processor 10, by allowing the smartphone 40 to be held over the reader-writer 8 while the print preview screen 420 is displayed on the touch panel 44 of the smartphone 40.

This improves usability for the user of the image processing system 1. One example image processing system may be configured to allow for the communication of the print data DP by allowing the user to hold the smartphone over the reader-writer after the user directly inputs the user name UN and the password PW on the authentication waiting screen and thereby switches the display screen from the authentication waiting screen to the menu screen. In this case, the user needs to operate both the smartphone and the image processor, which is troublesome. Further, when the user finishes using the image processor, the user needs to operate the "logout" button to thereby return the display screen to the authentication waiting screen, which is also troublesome. Further, the user may possibly forget to operate the "logout" button when the user finishes using the image processor. This allows another person to operate the image processor by masquerading as the user. This may possibly degrade security.

In contrast, in the image processing system 1 according to the present example embodiment, holding the smartphone 40 over the reader-writer 8 makes it possible to perform the communication of the print data DP while the authentication waiting screen 110 is kept displayed as the display screen of the image processor 10. This makes it unnecessary for the user to directly operate the image processor 10. Hence, it is possible to improve usability for the user. Moreover, the authentication waiting screen 110 may be kept displayed as the display screen. This prevents another person from operating the image processor 10. Hence, it is possible to improve security.

Moreover, the image processing system 1 may allow for the communication of the network setting information IN on a condition that the smartphone 40 is held over the reader-writer 8 while the print preview screen 420 illustrated in FIG. 8B is displayed on the touch panel 44 of the smartphone 40. This makes it unnecessary for the user to perform the network setting of the smartphone 40. Hence, it is possible to improve usability for the user. In particular, the latest network setting information IN may be subjected to the communication, for example, even in a case where the network setting of the image processor 10 is changed. This makes it unnecessary for the user to perform the network setting of the smartphone 40 again. Hence, it is possible to improve usability for the user.

Moreover, the image processing system 1 may perform the authentication process with the use of the terminal identification information ID. This makes it unnecessary for the user to operate the smartphone 40 to input again the user name UN, the password PW, or any other data, even in a case where the user management information 16A of the image processor 10 is edited, and for example, the user name UN, the password PW, or any other data is changed. Hence, it is possible to improve usability for the user.

[Operation Example OP2]

A description is given next of an operation of the image processing system 1 in a case where the display screen of the image processor 10 is switched from the authentication waiting screen 110 illustrated in FIG. 2A to the menu screen 120 illustrated in FIG. 2B by allowing the smartphone 40 to be held over the reader-writer 8.

Figure 14:
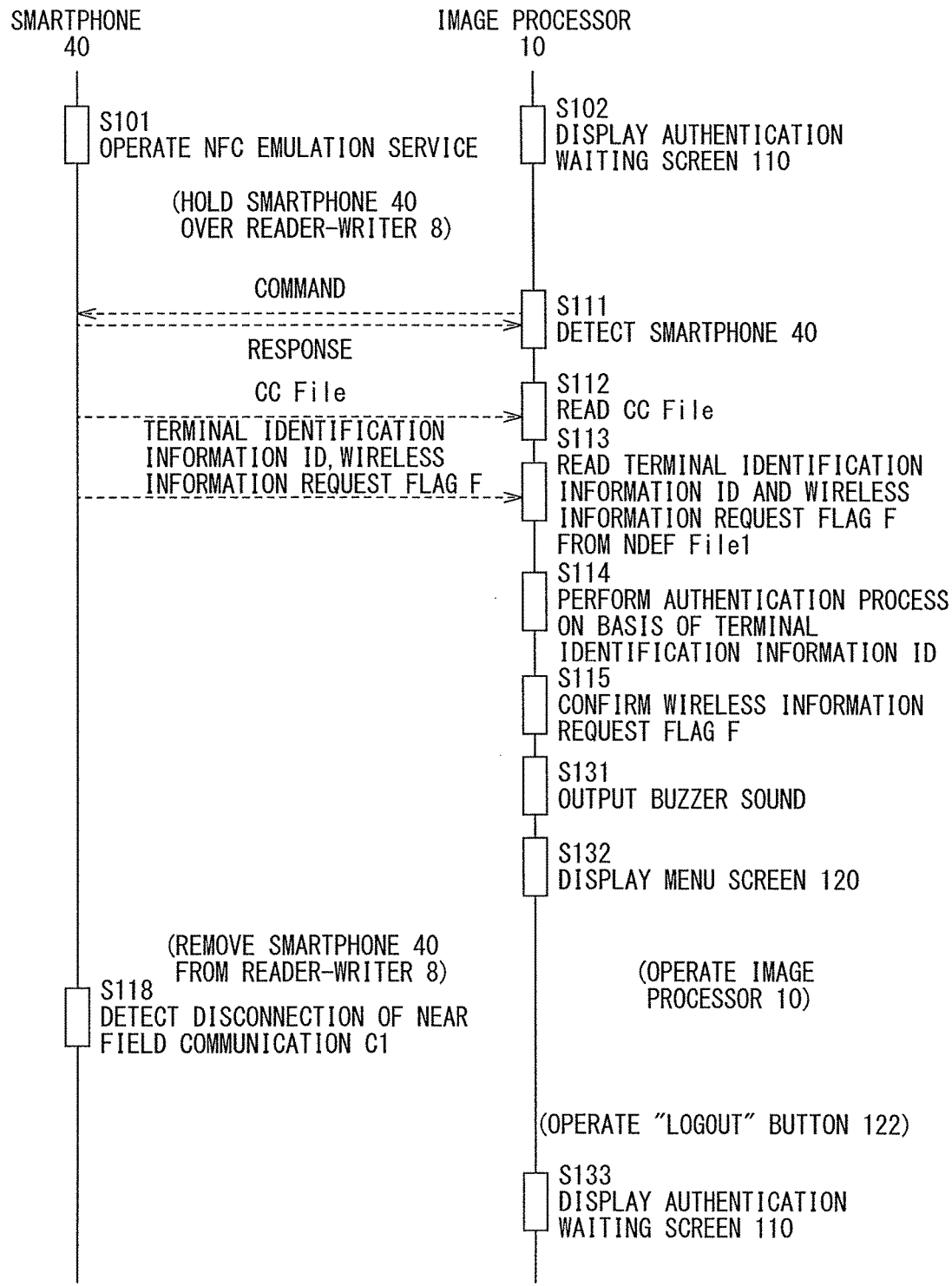
FIG. 14 is a sequence diagram illustrating another example of the operation of the image processing system illustrated in FIG. 1.

FIG. 14 illustrates an example of an operation of the image processing system 1 according to the operation example OP2. As with the operation example OP1, first, the NFC emulation service may be operated in the smartphone 40 (step S101). In the image processor 10, the touch panel 15 may display the authentication waiting screen 110 (step S102).

Unlike the operation example OP1 illustrated in FIGS. 13A and 13B, the user may not cause the touch panel 44 of the smartphone 40 to display the print preview screen 420 in the operation example OP2. In this case, the wireless information request flag F indicating "OFF" may be written into the "NDEF message" field of the "NDEF File1".

Thereafter, when the user holds the smartphone 40 over the reader-writer 8, the image processor 10 may detect the smartphone 40 (step S111). Further, the image processor 10 may read the "CC File" from the smartphone 40 (step S112), read the terminal identification information ID and the wireless information request flag F from the "NDEF File1" (step S113), and perform the authentication process on the terminal identification information ID (step S114).

Thereafter, the reader-writer controller 26 of the image processor 10 may confirm whether the wireless information request flag F acquired in step S113 indicates "ON" or "OFF" (step S115).

In this example, the wireless information request flag F indicates "OFF". Therefore, the image processor 10 may output a buzzer sound indicating that the smartphone 40 can be removed from the reader-writer 8 (step S131), and display the menu screen 120 (step S132). Specifically, the touch panel controller 27 of the image processor 10 may switch the display screen of the touch panel 15 from the authentication waiting screen 110 illustrated in FIG. 2A to the menu screen 120 illustrated in FIG. 2B on the basis of the wireless information request flag F indicating "OFF". Further, the image processor 10 may perform the various settings related to the user.

Thereafter, the user may remove the smartphone 40 from the reader-writer 8. This may cause the emulation controller 54 of the smartphone 40 to detect disconnection of the near field communication C1 (step S118).

Thereafter, the user may operate any of the function icons 121 to thereby select the function which the user intends to use, on the menu screen 120 illustrated in FIG. 2B displayed on the touch panel 15 of the image processor 10. This may cause the image processor 10 to perform the process on the basis of the instruction given by the user.

Thereafter, the user may operate the "logout" button 122 on the menu screen 120 illustrated in FIG. 2B. This may cause the image processor 10 to display the authentication waiting screen 110 (step S133). Specifically, the image processor 10 may perform the logout process. Further, the touch panel controller 27 may switch the display screen of the touch panel 15 from the menu screen 120 to the authentication waiting screen 110 illustrated in FIG. 2A.

This may bring the sequence to the end.

As described above, the image processing system 1 may switch the display screen of the image processor 10 from the authentication waiting screen 110 illustrated in FIG. 2A to the menu screen 120 illustrated in FIG. 2B, by allowing the smartphone 40 to be held over the reader-writer 8 while the print preview screen 420 is not displayed on the touch panel 44 of the smartphone 40. This makes it unnecessary for the user to directly input the user name UN and the password PW on the authentication waiting screen 110 in the image processing system 1. Hence, it is possible to improve usability for the user.

Moreover, in the image processing system 1, the image processor 10 may perform different processes depending on the display screen of the touch panel 44 displayed when the smartphone 40 is held over the reader-writer 8. This makes it possible for the image processor 10 in the image processing system 1 to perform an operation in accordance with an intention of the user. Hence, it is possible to improve usability for the user. Specifically, for example, on a condition that the smartphone 40 is held over the reader-writer 8 while the print preview screen 420 illustrated in FIG. 8 is displayed on the touch panel 44, the image processor 10 may determine that the user intends to print the image related to the print preview screen 420, and perform the communication of the print data DP. Alternatively, for example, on a condition that the smartphone 40 is held over the reader-writer 8 while the print preview screen 420 is not displayed on the touch panel 44, the image processor 10 may determine that the user intends to use various functions of the image processor 10, and switch the display screen from the authentication waiting screen 110 illustrated in FIG. 2A to the menu screen 120 illustrated in FIG. 2B. As a result, it is possible to effectively reduce the number of times the user directly operates the touch panel 15 of the image processor 10 in the image processing system 1. Hence, it is possible to improve usability for the user.

[Effects]

As described above, according to the present example embodiment, it is possible to perform the communication of the print data while the authentication waiting screen is kept displayed as the display screen of the image processor, by allowing the smartphone to be held over the reader-writer. This reduces the number of times of the operation by the user. Hence, it is possible to improve usability for the user.

According to the present example embodiment, the communication of the network setting information may be performed on a condition that the smartphone is held over the reader-writer while the print preview screen is displayed on the touch panel of the smartphone. This makes it unnecessary for the user to perform the network setting of the smartphone. Hence, it is possible to improve usability for the user.

According to the present example embodiment, the authentication process may be performed with the use of the terminal identification information. This makes it unnecessary for the user to operate the smartphone and to thereby input the user name, the password, etc. again, even in a case where the user management information is edited and, for example, the user name, the password, etc. are changed. Hence, it is possible to improve usability for the user.

According to the present example embodiment, the display screen of the image processor may be switched from the authentication waiting screen to the menu screen by allowing the smartphone to be held over the reader-writer while the print preview screen is displayed on the touch panel of the smartphone. This eliminates the necessity of the direct input, by the user, of the user name and the password on the authentication waiting screen. Hence, it is possible to improve usability for the user.

According to the present example embodiment, the image processor may perform different processes depending on the display screen of the touch panel displayed when the smartphone is held over the reader-writer. This makes it possible to effectively reduce the number of times the user directly operates the touch panel of the image processor. Hence, it is possible to improve usability for the user.

[Modification Example 1]

According to the foregoing example embodiment, the smartphone 40 may be held over the reader-writer 8 when the touch panel 15 of the image processor 10 displays the authentication waiting screen 110 illustrated in FIG. 2A; however, when to hold the smartphone 40 over the reader-writer 8 is not limited thereto. In one alternative example embodiment, the smartphone 40 may be held over the reader-writer 8 when the touch panel 15 of the image processor 10 displays the menu screen 120 illustrated in FIG. 2B.

For example, on a condition that the touch panel 15 of the image processer 10 displays the menu screen 120 related to a particular user U1, and the user U1 holds his or her smartphone 40 over the reader-writer 8 while the print preview screen 420 is displayed on the touch panel 44 of the smartphone 40 belonging to the user U1, the image processor 10 may be able to print the image related to the print preview screen 420 displayed on the touch panel 44 of the smartphone 40 belonging to the user U1.

For example, on a condition that the touch panel 15 of the image processer 10 displays the menu screen 120 related to the particular user U1, and another user U2 holds his or her smartphone 40 over the reader-writer 8 while the print preview screen 420 is displayed on the touch panel 44 of the smartphone 40 belonging to the user U2, the image processor 10 may be able to print the image related to the print preview screen 420 displayed on the touch panel 44 of the smartphone 40 belonging to the user U2. The user U2 may be a different user from the user U1.

Moreover, for example, on a condition that the touch panel 15 of the image processer 10 displays the menu screen 120 related to the particular user U1, and another user U2 holds his or her smartphone 40 over the reader-writer 8 while the print preview screen 420 is displayed on the touch panel 44 of the smartphone 40 belonging to the user U2, the image processor 10 may perform switching from the menu screen 120 related to the user U1 to the menu screen 120 related to the user U2. The user U2 may be a different user from the user U1. In this case, the image processor 10 may perform the switching from the menu screen 120 related to the user U1 to the menu screen 120 related to the user U2, for example, when the process state is not busy. Alternatively, for example, on a condition that the smartphone 40 of the user U2 is held over the reader-writer 8 after the process state has not been busy for a predetermined period of time or more, the image processor 10 may perform the switching from the menu screen 120 related to the user U1 to the menu screen 120 related to the user U2. The predetermined period of time may be, for example but not limited to, thirty seconds. Although this example involves the switching from the menu screen 120 related to the user U1 to the menu screen 120 related to the user U2, this is non-limiting. In one alternative example embodiment, the switching from the menu screen 120 related to the user U1 to the menu screen 120 related to the user U2 may not be performed.

[Modification Example 2]

According to the foregoing example embodiment, the image processor 10 may supply the network setting information IN to the smartphone 40; however, what is supplied by the image processor 10 to the smartphone 40 is not limited thereto. In one alternative example embodiment, the image processor 10 may supply the smartphone 40 with the user name UN and the password PW in addition to the network setting information IN. A detailed description is given below of an image processing system 1A according to Modification example 2.

Figure 15A:
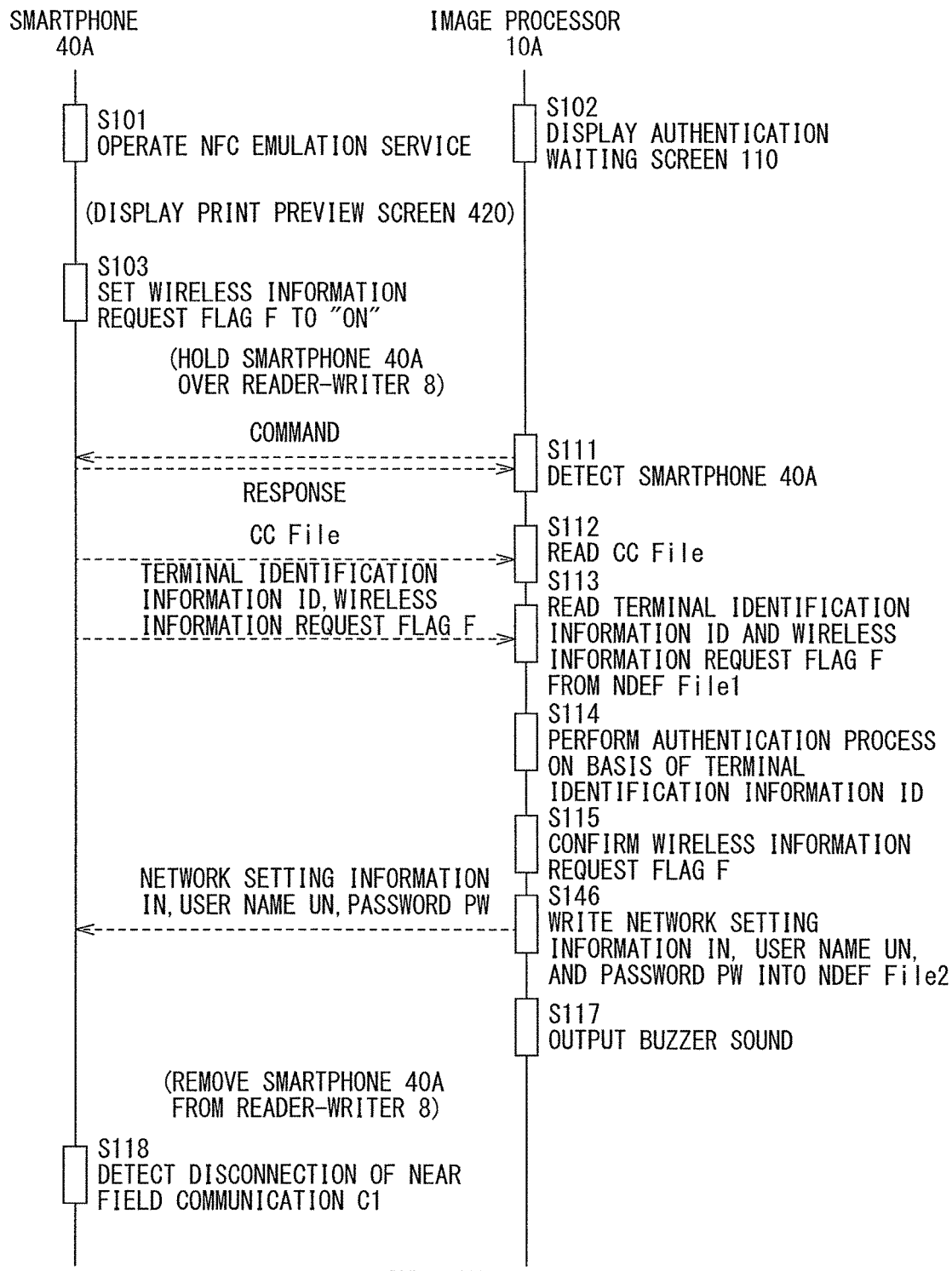
FIG. 15A is a sequence diagram illustrating an example of an operation of an image processing system according to a modification example.
Figure 15B:
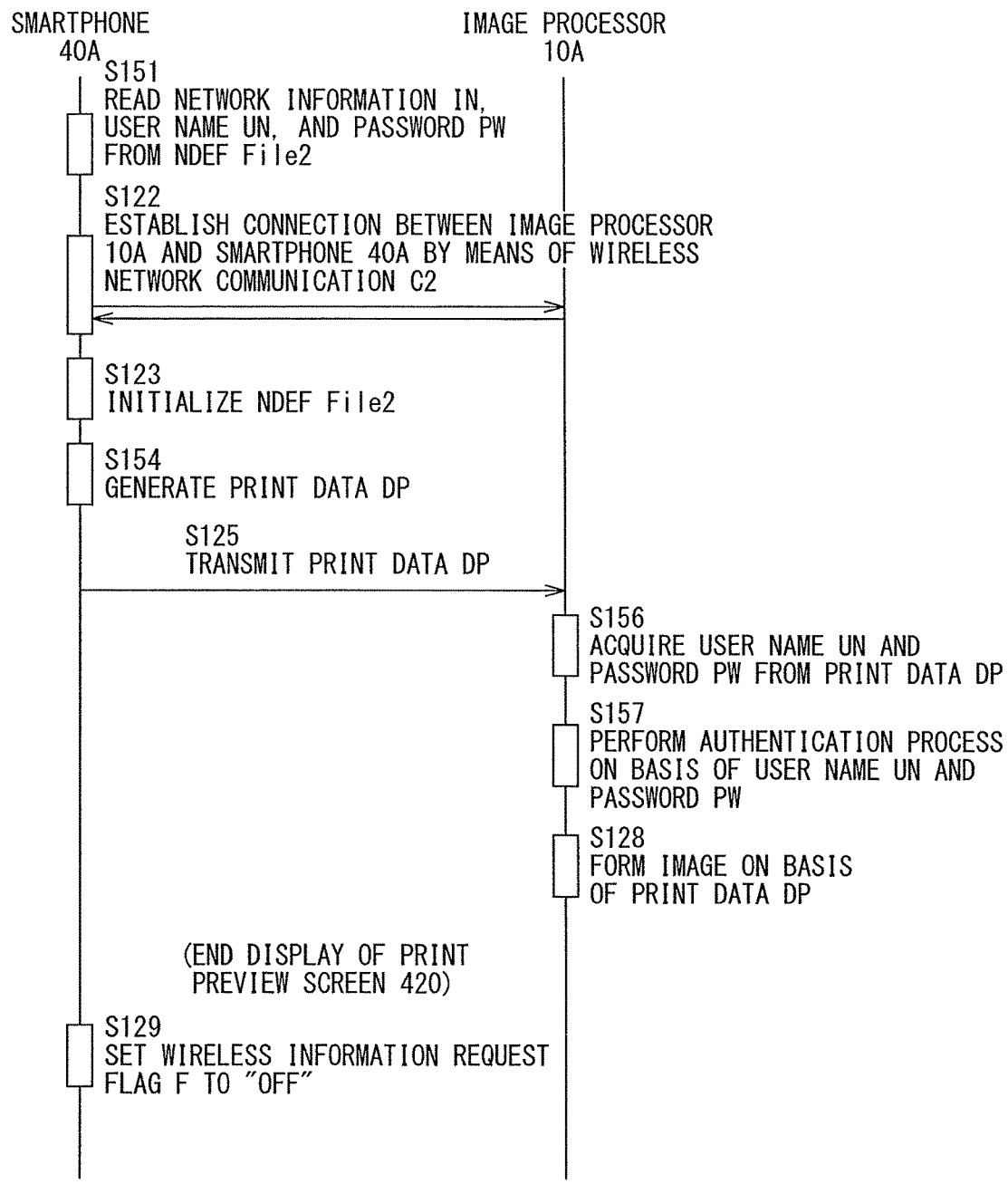
FIG. 15B is another sequence diagram illustrating the example of the operation of the image processing system according to the modification example.

FIGS. 15A and 15B each illustrate an example of an operation of the image processing system 1A according to the operation example OP1. First, the NFC emulation service may be operated in the smartphone 40A of the image processing system 1A (step S101). In an image processor 10A of the image processing system 1A, the touch panel 15 may display the authentication waiting screen 110 (step S102).

Thereafter, the user may operate the smartphone 40A to thereby start up an image transmission application 60A. Further, the user may select the image which the user intends to print, and display the print preview screen 420 illustrated in FIG. 8B on the touch panel 44. This may cause the smartphone 40A to set the wireless information request flag F to "ON" (step S103).

Thereafter, when the user holds the smartphone 40A over the reader-writer 8, the image processor 10A of the image processing system 1A may detect the smartphone 40A (step S111). Further, the image processor 10A may read the "CC File" from the smartphone 40A (step S112), and read the terminal identification information ID and the wireless information request flag F from the "NDEF File1" (step S113). Thereafter, the image processor 10A may perform the authentication process on the basis of the terminal identification information ID (step S114), and confirm the wireless information request flag F (step S115).

Figure 16:
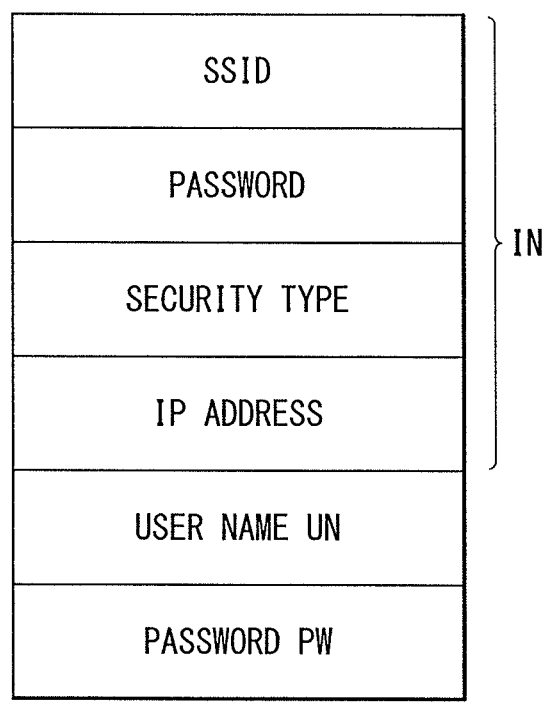
FIG. 16 describes an example of an NDEF message of "NDEF File2" according to the modification example.

In this example, the wireless information request flag F indicates "ON". Therefore, the image processor 10A may thereafter write the network setting information IN, the user name UN, and the password PW into the "NDEF File2" (step S146). Specifically, a reader-writer controller 26A of the image processor 10A may acquire the network setting information IN from the wireless communication setter 24. Further, the reader-writer controller 26A may select the "NDEF File2" of the "CC File", and write the network setting information IN, the user name UN, and the password PW into the selected "NDEF File2" as illustrated in FIG. 16.

Thereafter, the image processor 10A may output a buzzer sound indicating that the smartphone 40A can be removed from the reader-writer 8 (step S117).

Thereafter, the user may remove the smartphone 40A from the reader-writer 8. This may cause the emulation controller 54 of the smartphone 40A to detect disconnection of the near field communication C1 (step S118).

Referring to FIG. 15B, thereafter, the smartphone 40A may read the network setting information IN, the user name UN, and the password PW from the "NDEF File2" (step S151). Specifically, the tag data reader 63 of the image transmission application 60A may read the network setting information IN that has been written into the "NDEF File 2" in step S116.

Thereafter, the smartphone 40A may establish a connection between the image processor 10A and the smartphone 40A by means of the wireless network communication C2 (step S122). Thereafter, the smartphone 40A may delete all the information in the "NDEF File2" and initialize the "NDEF File2" for confidentiality (step S123).

Thereafter, the smartphone 40A may generate the print data DP (step S124). Specifically, a print data generator 66A of the image transmission application 60A may generate the print data DP on the basis of: the image data related to the preview image 421 on the print preview screen 420 illustrated in FIG. 8B that is displayed on the touch panel 44; the printing parameters set on the print preview screen 420; and the user name UN and the password PW acquired in step S151. In this example, the "job type" may be set to the authentication job J2, and the "authentication information" may be set to the user name UN and the password PW.

Thereafter, the smartphone 40A may transmit the print data DP to the image processor 10A (step S125).

Thereafter, the image processor 10A may acquire the user name UN and the password PM from the print data DP (step S156). Specifically, a print data analyzer 36A of the image processor 10A may acquire the user name UN and the password PW from the "authentication information" in the print data DP illustrated in FIG. 9. When the user name UN and the password PW are encrypted, the user name UN and the password PW may be subjected to decoding.

Thereafter, the image processor 10A may perform the authentication process on the basis of the user name UN and the password PW (step S157). Specifically, the print data analyzer 36A may supply the authentication unit 33 with the user name UN and the password PW both acquired in step S156, and make a request for the authentication process to the authentication unit 33. The authentication unit 33 may perform the authentication process. When the authentication process is successful, the authentication unit 33 may confirm whether the user has the authority for using the "print" function. When the user has the authority for using the "print" function, the authentication unit 33 may notify the print data analyzer 36A of the success of the authentication process.

Thereafter, the image processor 10A may form the image on the recording medium on the basis of the print data DP (step S128).

Thereafter, the user may end the display of the print preview screen 420 by operating the image transmission application 60A of the smartphone 40A. This may cause the smartphone 40A to set the wireless information request flag F to "OFF" (step S129).

This may bring the sequence to the end.

[Other Modification Examples]

The technology encompasses any possible combination of two or more of the various embodiments and the modification examples described herein.

The technology has been described above referring to the example embodiments and the modification examples thereof; however, the technology is not limited to the example embodiments and the modification examples described above, and is modifiable in various ways.

For example, the example embodiments and the modification examples have been described above referring to an example where the technology is applied to the image processor 10 that serves as the multi-function peripheral; however, the application of the technology is not limited thereto. In one alternative example embodiment, the technology may be applied to a mono-function printer.

Moreover, the foregoing example embodiments and the modification examples thereof have been described above referring to an example in which the communication of the print data DP is performed by allowing the smartphone 40 to be held over the reader-writer 8 while the print preview screen 420 is displayed on the touch panel 44 of the smartphone 40; however, the technology is also applicable to various functions other than printing. According to one modification example, it is possible to give an image processor 10B according to the present modification example an instruction for a pull scanning process by allowing a smartphone 40B according to the present modification example to be held over the reader-writer 8 while a read screen is displayed on the touch panel 44 of the smartphone 40B. Specifically, when the read screen is displayed on the touch panel 44 of the smartphone 40B, the wireless information request flag F may be set to "ON". On this occasion, setting of a read parameter such as resolution and a color classification may be performed on the read screen displayed on the smartphone 40B. Further, the image processor 10B may acquire the terminal identification information ID and the wireless information request flag F by means of the near field communication C1. After performing the authentication process on the basis of the terminal identification information ID, the image processor 10B may supply the network setting information IN to the smartphone 40B by means of the near field communication C1 on the basis of the wireless information request flag F indicating "ON". The smartphone 40B may perform the network setting on the basis of the supplied network setting information IN, establish a connection between the image processor 10B and the smartphone 40B by means of the wireless network communication C2, and supply the read parameter to the image processor 10B. The image reader 17 of the image processor 10B may read information from a recording medium to be read on the basis of the supplied read parameter, and generate read data DR. Further, the image processor 10B may supply the generated read data DR to the smartphone 40B by means of the wireless network communication C2. This may cause an image related to the read data DR to be displayed on the touch panel 44 of the smartphone 40B. For example, it is possible to perform the scanning process while the authentication waiting screen 110 is kept displayed as the display screen of the image processor 10B, also in this example case. Further, in one modification example, the technology is applicable to an image processor that is able to perform communication of both the print data DP and the read data DR.

It is possible to achieve at least the following configurations from the above-described example embodiments of the technology.

(1)

An image processor including:

an information acquiring circuitry that causes a first communicator to perform communication between a mobile terminal and the first communicator and thereby acquires status information and identification information, the status information indicating a status of the mobile terminal, the identification information being information on identification of the mobile terminal;

an authentication circuitry that performs a first authentication process on a basis of the identification information;

a second communicator that performs communication of image data between the mobile terminal and the second communicator;

a display that displays an authentication waiting screen and a first post-authentication screen, the authentication waiting screen receiving an input of authentication information, the first post-authentication screen corresponding to first authentication information; and a controller that selects, on a basis of the status information, one of a first operation and a second operation on a condition that the first authentication process is successful when the display displays the authentication waiting screen, the first operation causing the display to display the first post-authentication screen, the second operation causing the second communicator to perform the communication of the image data without causing the display to display the first post-authentication screen.

(2)

The image processor according to (1), in which the display also displays a second post-authentication screen corresponding to second authentication information, and the controller determines, on the basis of the status information, whether to perform a third operation on a condition that the first authentication process is successful when the display displays the second post-authentication screen, the third operation causing the second communicator to perform the communication of the image data.

(3)

The image processor according to (2), in which the controller further determines, on the basis of the status information, whether to perform a fourth operation on a condition that the first authentication process is successful when the display displays the second post-authentication screen, the fourth operation causing the display to display the first post-authentication screen.

(4)

The image processor according to any one of (1) to (3), in which the status information indicates execution or non-execution of a predetermined process by the mobile terminal.

(5)

The image processor according to (4), in which
the image data includes print data,
the second communicator receives the print data from the mobile terminal, and
the predetermined process causes a display of the mobile terminal to display an image indicated by the print data.

(6)

The image processor according to (4), in which
the image data includes read data,
the second communicator supplies the read data to the mobile terminal, and
the predetermined process makes a preparation for causing a display of the mobile terminal to display an image indicated by the read data.

(7)

The image processor according to any one of (4) to (6), in which the controller selects the first operation on a condition that the status information indicates the non-execution of the predetermined process by the mobile terminal.

(8)

The image processor according to any one of (4) to (7), in which the controller selects the second operation on a condition that the status information indicates the execution of the predetermined process by the mobile terminal.

(9)

The image processor according to (8), in which the first communicator supplies the mobile terminal with communication setting information on a condition that the controller selects the second operation, the communication setting information being directed to communication between the second communicator and the mobile terminal.

(10)

The image processor according to (9), in which
the image data includes print data including the identification information,
the second communicator receives the print data from the mobile terminal, and
the authentication circuitry performs second authentication process on the basis of the identification information included in the print data.

(11)

The image processor according to (9), in which
the authentication circuitry stores the first authentication information and the identification information in association with each other, and
the first communicator further supplies the mobile terminal with, in addition to the communication setting information, the first authentication information corresponding to the identification information, on a condition that the controller selects the second operation.

(12)

The image processor according to (11), in which
the image data includes print data including the first authentication information,
the second communicator receives the print data from the mobile terminal, and
the authentication circuitry performs a second authentication process on the basis of the first authentication information included in the print data.

(13)

The image processor according to (10) or (12), further including an image forming unit that forms an image on the basis of the print data on a condition that the second authentication process is successful.

(14)

The image processor according to any one of (1) to (4), further including an image reader, in which
the image data includes read data,
the image reader may read an image and thereby generates the read data, and
the second communicator supplies the read data to the mobile terminal.

(15)

The image processor according to any one of (1) to (14), in which the first communicator performs the communication between the mobile terminal and the first communicator by near field communication.

(16)

The image processor according to any one of (1) to (15), further including the first communicator.

(17)

An image processor including:
a communicator that performs communication between a mobile terminal and the communicator;
an information acquiring circuitry that acquires status information and identification information by the communication between the mobile terminal and the communicator, the status information indicating a status of the mobile terminal, the identification information being information on identification of the mobile terminal;
an authentication circuitry that performs an authentication process on the basis of the identification information acquired by the information acquiring circuitry; and
a controller that determines, on the basis of the status information, to perform one of a transition operation and an image data reception operation on a condition that the authentication process by the authentication circuitry is successful on the basis of the identification information, the transition operation making a transition to a login status in which a user corresponding to the identification information performs login, the image data reception operation receiving image data from the mobile terminal without making the transition to the login status.

(18)

An image processing system including:
a mobile terminal; and
an image processor, the image processor including
an information acquiring circuitry that causes a first communicator to perform communication between the mobile terminal and the first communicator and thereby acquires status information and identification information, the status information indicating a status of the mobile terminal, the identification information being information on identification of the mobile terminal,
an authentication circuitry that performs a first authentication process on the basis of the identification information, a second communicator that performs communication of image data between the mobile terminal and the second communicator, a display that displays an authentication waiting screen and a first post-authentication screen, the authentication waiting screen receiving an input of authentication information, the first post-authentication screen corresponding to first authentication information, and a controller that selects, on the basis of the status information, one of a first operation and a second operation on a condition that the first authentication process is successful when the display displays the authentication waiting screen, the first operation causing the display to display the first post-authentication screen, the second operation causing the second communicator to perform the communication of the image data without causing the display to display the first post-authentication screen.

(19)

The image processing system according to (18), in which the mobile terminal includes:

a third communicator that performs communication between the first communicator and the third communicator; and a fourth communicator that performs communication of the image data between the second communicator and the fourth communicator, in which the first communicator supplies communication setting information to the third communicator of the mobile terminal on a condition that the controller selects the second operation, and in which the fourth communicator performs communication setting on the basis of the communication setting information, and thereby performs the communication between the second communicator and the fourth communicator.

According to the image processor and the image processing system of the embodiment of the technology, one of the first operation and the second operation is selected on the basis of the status information, on the condition that the first authentication process is successful when the display displays the authentication waiting screen. The first operation causes the display to display the first post-authentication screen. The second operation causes the second communicator to perform the communication of the image data without causing the display to display the first post-authentication screen. Hence, it is possible to improve usability for a user.

According to the image processor of the embodiment of the technology, one of the transition operation and the image data reception operation is determined to be performed on the basis of the status information, on the condition that the authentication process by the authentication circuitry is successful on the basis of the identification information. The transition operation makes the transition to the login status in which the user corresponding to the identification information performs login. The image data reception operation receives the image data from the mobile terminal without making the transition to the login status. Hence, it is possible to improve usability for a user.

Each of the controller 19 illustrated in FIG. 1 and the controller 49 illustrated in FIG. 5 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of each of the controller 19 illustrated in FIG. 1 and the controller 49 illustrated in FIG. 5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the controller 19 illustrated in FIG. 1 and the controller 49 illustrated in FIG. 5.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive.

What is claimed is:

1. An image processor comprising:

an information acquiring circuitry that causes a first communicator to perform communication between a mobile terminal and the first communicator and thereby acquires status information and identification information, the status information indicating a status of the mobile terminal, the identification information being information on identification of the mobile terminal;

an authentication circuitry that performs a first authentication process on a basis of the identification information;

a second communicator that performs communication of image data between the mobile terminal and the second communicator;

a display that displays an authentication waiting screen and a first post-authentication screen, the authentication waiting screen receiving an input of authentication information, the first post-authentication screen corresponding to first authentication information; and a controller that selects, on a basis of the status information, one of a first operation and a second operation on a condition that the first authentication process is successful when the display displays the authentication waiting screen, the first operation causing the display to display the first post-authentication screen, the second operation causing the second communicator to perform the communication of the image data without causing the display to display the first post-authentication screen.

2. The image processor according to claim 1, wherein the display also displays a second post-authentication screen corresponding to second authentication information, and the controller determines, on the basis of the status information, whether to perform a third operation on a condition that the first authentication process is successful when the display displays the second post-authentication screen, the third operation causing the second communicator to perform the communication of the image data.

3. The image processor according to claim 2, wherein the controller further determines, on the basis of the status information, whether to perform a fourth operation on a condition that the first authentication process is successful when the display displays the second post-authentication screen, the fourth operation causing the display to display the first post-authentication screen.

4. The image processor according to claim 1, wherein the status information indicates execution or non-execution of a predetermined process by the mobile terminal.

5. The image processor according to claim 4, wherein
the image data comprises print data,
the second communicator receives the print data from the mobile terminal, and
the predetermined process causes a display of the mobile terminal to display an image indicated by the print data.

6. The image processor according to claim 4, wherein
the image data comprises read data,
the second communicator supplies the read data to the mobile terminal, and
the predetermined process makes a preparation for causing a display of the mobile terminal to display an image indicated by the read data.

7. The image processor according to claim 4, wherein the controller selects the first operation on a condition that the status information indicates the non-execution of the predetermined process by the mobile terminal.

8. The image processor according to claim 4, wherein the controller selects the second operation on a condition that the status information indicates the execution of the predetermined process by the mobile terminal.

9. The image processor according to claim 8, wherein the first communicator supplies the mobile terminal with communication setting information on a condition that the controller selects the second operation, the communication setting information being directed to communication between the second communicator and the mobile terminal.

10. The image processor according to claim 9, wherein
the image data comprises print data including the identification information,
the second communicator receives the print data from the mobile terminal, and
the authentication circuitry performs second authentication process on a basis of the identification information included in the print data.

11. The image processor according to claim 9, wherein
the authentication circuitry stores the first authentication information and the identification information in association with each other, and
the first communicator further supplies the mobile terminal with, in addition to the communication setting information, the first authentication information corresponding to the identification information, on a condition that the controller selects the second operation.

12. The image processor according to claim 11, wherein
the image data comprises print data including the first authentication information,
the second communicator receives the print data from the mobile terminal, and
the authentication circuitry performs a second authentication process on a basis of the first authentication information included in the print data.

13. The image processor according to claim 10, further comprising an image forming unit that forms an image on a basis of the print data on a condition that the second authentication process is successful.

14. The image processor according to claim 1, further comprising an image reader, wherein
the image data comprises read data,
the image reader may read an image and thereby generates the read data, and
the second communicator supplies the read data to the mobile terminal.

15. The image processor according to claim 1, wherein the first communicator performs the communication between the mobile terminal and the first communicator by near field communication.

16. The image processor according to claim 1, further comprising the first communicator.

17. An image processor comprising:
a communicator that performs communication between a mobile terminal and the communicator;
an information acquiring circuitry that acquires status information and identification information by the communication between the mobile terminal and the communicator, the status information indicating a status of the mobile terminal, the identification information being information on identification of the mobile terminal;
an authentication circuitry that performs an authentication process on a basis of the identification information acquired by the information acquiring circuitry; and
a controller that determines, on a basis of the status information, to perform one of a transition operation and an image data reception operation on a condition that the authentication process by the authentication circuitry is successful on the basis of the identification information, the transition operation making a transition to a login status in which a user corresponding to the identification information performs login, the image data reception operation receiving image data from the mobile terminal without making the transition to the login status.

18. An image processing system comprising:
a mobile terminal; and
an image processor including
an information acquiring circuitry that causes a first communicator to perform communication between the mobile terminal and the first communicator and thereby acquires status information and identification information, the status information indicating a status of the mobile terminal, the identification information being information on identification of the mobile terminal,
an authentication circuitry that performs a first authentication process on a basis of the identification information,
a second communicator that performs communication of image data between the mobile terminal and the second communicator,
a display that displays an authentication waiting screen and a first post-authentication screen, the authentication waiting screen receiving an input of authentication information, the first post-authentication screen corresponding to first authentication information, and
a controller that selects, on a basis of the status information, one of a first operation and a second operation on a condition that the first authentication process is successful when the display displays the authentication waiting screen, the first operation causing the display to display the first post-authentication screen, the second operation causing the second communicator to perform the communication of the image data without causing the display to display the first post-authentication screen.

19. The image processing system according to claim 18, wherein the mobile terminal includes:
- a third communicator that performs communication between the first communicator and the third communicator; and
- a fourth communicator that performs communication of the image data between the second communicator and the fourth communicator, wherein the first communicator supplies communication setting information to the third communicator of the mobile terminal on a condition that the controller selects the second operation, and wherein the fourth communicator performs communication setting on a basis of the communication setting information, and thereby performs the communication between the second communicator and the fourth communicator.

* * * * *